US010900350B2

(12) United States Patent
Lazarev et al.

(10) Patent No.: US 10,900,350 B2
(45) Date of Patent: Jan. 26, 2021

(54) RFID DEVICE FOR USE DOWNHOLE

(71) Applicant: Weatherford Technology Holdings, LLC, Houston, TX (US)

(72) Inventors: Alexander A. Lazarev, Cypress, TX (US); Albert C. Odell, II, Kingwood, TX (US); Iain Macleod, Newmachar (GB); Marius Raducanu, College Station, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 197 days.

(21) Appl. No.: 15/433,729

(22) Filed: Feb. 15, 2017

(65) Prior Publication Data

US 2017/0159363 A1    Jun. 8, 2017

Related U.S. Application Data

(63) Continuation of application No. 14/067,676, filed on Oct. 30, 2013, now abandoned.

(60) Provisional application No. 61/885,981, filed on Oct. 2, 2013.

(51) Int. Cl.
| | | |
|---|---|---|
| E21B 47/13 | (2012.01) | |
| E21B 10/26 | (2006.01) | |
| E21B 7/28 | (2006.01) | |
| E21B 10/32 | (2006.01) | |
| G06K 19/077 | (2006.01) | |
| E21B 10/30 | (2006.01) | |
| E21B 47/07 | (2012.01) | |
| E21B 47/024 | (2006.01) | |

(Continued)

(52) U.S. Cl.
CPC ............ *E21B 47/13* (2020.05); *E21B 7/28* (2013.01); *E21B 10/265* (2020.05); *E21B 10/30* (2013.01); *E21B 10/32* (2013.01); *G06K 19/0772* (2013.01); *G06K 19/07773* (2013.01); *E21B 47/024* (2013.01); *E21B 47/06* (2013.01); *E21B 47/07* (2020.05); *E21B 47/18* (2013.01)

(58) Field of Classification Search
CPC ........ E21B 47/122; E21B 10/26; E21B 10/30; E21B 7/28; E21B 47/13; E21B 10/32; E21B 10/265; G06K 19/0772; G06K 19/07773

See application file for complete search history.

(56) References Cited

U.S. PATENT DOCUMENTS

| | | |
|---|---|---|
| 2,170,451 A | 8/1939 | Grant |
| 3,092,188 A | 6/1963 | Farris et al. |
| 3,813,656 A | 5/1974 | Fowler |

(Continued)

OTHER PUBLICATIONS

Snider, Philip M, et al.—AADE 2009NTCE-16-04: RFID Downhole Tools and Development for the Drilling Environment, 2009 National Technical Conference & Exhibition, New Orleans, Louisiana 2009, 3 pages.

(Continued)

*Primary Examiner* — Nicole Coy
(74) *Attorney, Agent, or Firm* — Patterson + Sheridan, LLP

(57) ABSTRACT

In one embodiment, a radio-frequency identification device for use in a wellbore includes a housing made of a polymer; and an antenna disposed in the housing. The polymer may be selected from the group consisting of an elastomer, a plastic, a rubber, a thermoplastic elastomer, and combinations thereof. The RFID device may also include a fill material disposed in the housing.

21 Claims, 17 Drawing Sheets

(51) Int. Cl.
*E21B 47/06* (2012.01)
*E21B 47/18* (2012.01)

(56) References Cited

U.S. PATENT DOCUMENTS

| | | | |
|---|---|---|---|
| 3,820,389 | A | 6/1974 | Richter, Jr. et al. |
| 4,013,945 | A | 3/1977 | Grosso |
| 4,282,941 | A | 8/1981 | Perkin |
| 4,515,225 | A | 5/1985 | Dailey |
| 4,763,258 | A | 8/1988 | Engelder |
| 5,318,137 | A | 6/1994 | Johnson et al. |
| 5,332,048 | A | 7/1994 | Underwood et al. |
| 5,963,132 | A * | 10/1999 | Yoakum ............... A01K 11/006 128/899 |
| 6,021,095 | A | 2/2000 | Tubel et al. |
| 6,267,185 | B1 | 7/2001 | Mougel et al. |
| 6,289,999 | B1 | 9/2001 | Dewey et al. |
| 6,536,524 | B1 | 3/2003 | Snider |
| 6,608,565 | B1 | 8/2003 | Van Steenwyk et al. |
| 6,668,949 | B1 | 12/2003 | Rives |
| 7,048,078 | B2 | 5/2006 | Dewey et al. |
| 7,100,713 | B2 | 9/2006 | Tulloch |
| 7,245,229 | B2 | 7/2007 | Baron et al. |
| 7,252,152 | B2 | 8/2007 | LoGiudice et al. |
| 7,360,594 | B2 | 4/2008 | Giroux et al. |
| 7,370,712 | B2 | 5/2008 | Stout et al. |
| 7,401,666 | B2 | 7/2008 | Fanuel et al. |
| 7,455,108 | B2 | 11/2008 | Jenkins et al. |
| 7,588,100 | B2 | 9/2009 | Hamilton |
| 7,703,553 | B2 | 4/2010 | Eddison et al. |
| 7,887,559 | B2 * | 2/2011 | Deng ............... A61B 17/32002 15/21.1 |
| 7,891,441 | B2 | 2/2011 | Lee |
| 7,900,717 | B2 | 3/2011 | Radford et al. |
| 8,028,763 | B2 | 10/2011 | Mackenzie |
| 8,028,767 | B2 | 10/2011 | Radford et al. |
| 8,540,035 | B2 | 9/2013 | Xu et al. |
| 2003/0155155 | A1 | 8/2003 | Dewey et al. |
| 2005/0145417 | A1 | 7/2005 | Radford et al. |
| 2005/0205305 | A1 | 9/2005 | Stout et al. |
| 2005/0241856 | A1 | 11/2005 | Lassoie et al. |
| 2006/0118339 | A1 | 6/2006 | Takhaundinov et al. |
| 2006/0207797 | A1 | 9/2006 | Dewey et al. |
| 2007/0107937 | A1 | 5/2007 | Sugiura |
| 2007/0285275 | A1 | 12/2007 | Purkis et al. |
| 2008/0041597 | A1 | 2/2008 | Fisher et al. |
| 2008/0128169 | A1 | 6/2008 | Radford et al. |
| 2008/0128174 | A1 | 6/2008 | Radford et al. |
| 2008/0128175 | A1 | 6/2008 | Radford et al. |
| 2008/0245532 | A1 | 10/2008 | Rhinehart et al. |
| 2008/0316049 | A1 | 12/2008 | Verret et al. |
| 2009/0223670 | A1 | 9/2009 | Snider |
| 2009/0230340 | A1 | 9/2009 | Purkis |
| 2009/0266544 | A1 | 10/2009 | Redlinger et al. |
| 2010/0089583 | A1 | 4/2010 | Xu et al. |
| 2013/0133949 | A1 | 5/2013 | Xu et al. |

OTHER PUBLICATIONS

Canadian Office Action dated Mar. 15, 2018, for Canadian Patent Application No. 2,831,496.
Canadian Office Action dated May 12, 2017, for Canadian Patent Application No. 2,831,496.

* cited by examiner

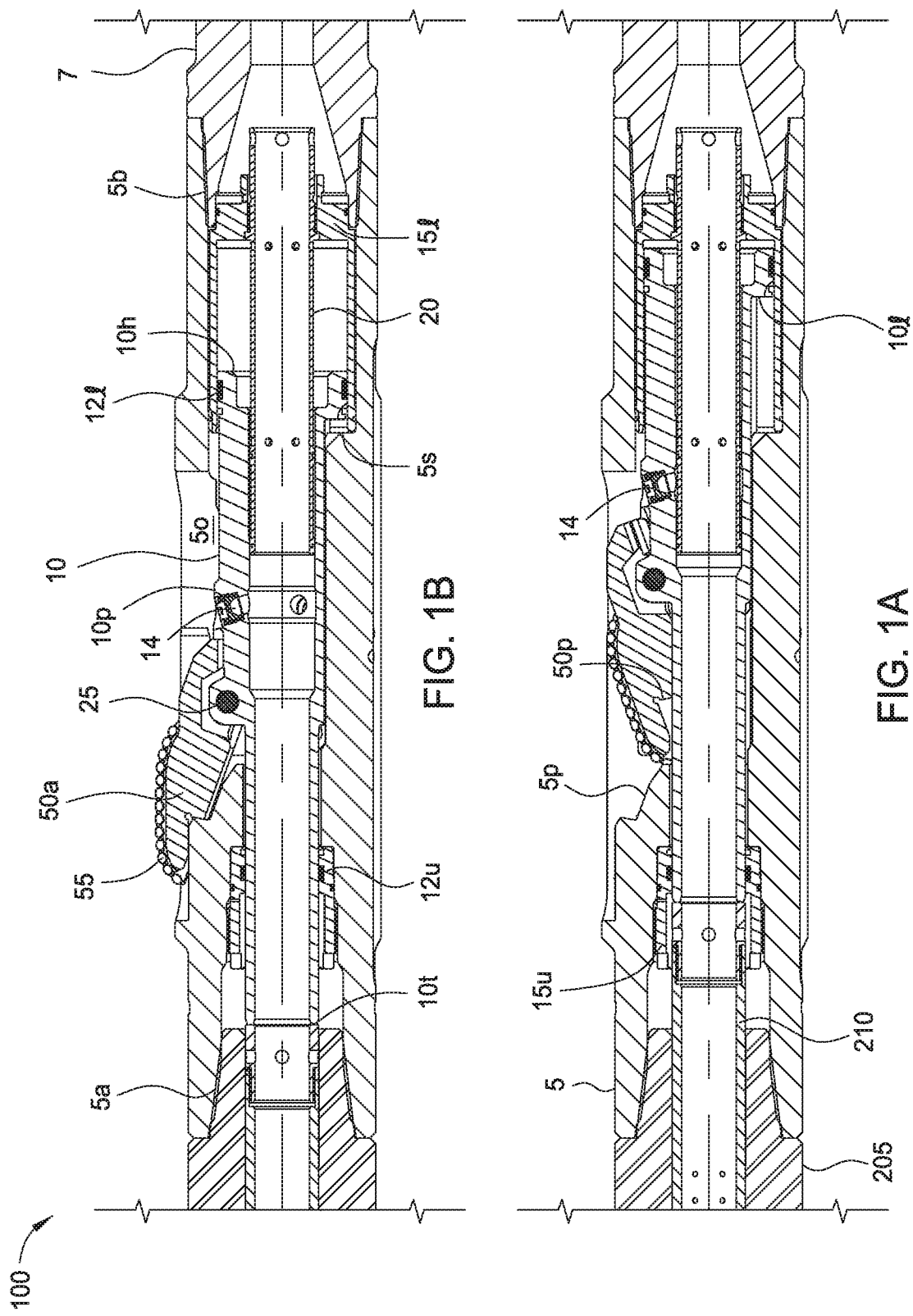

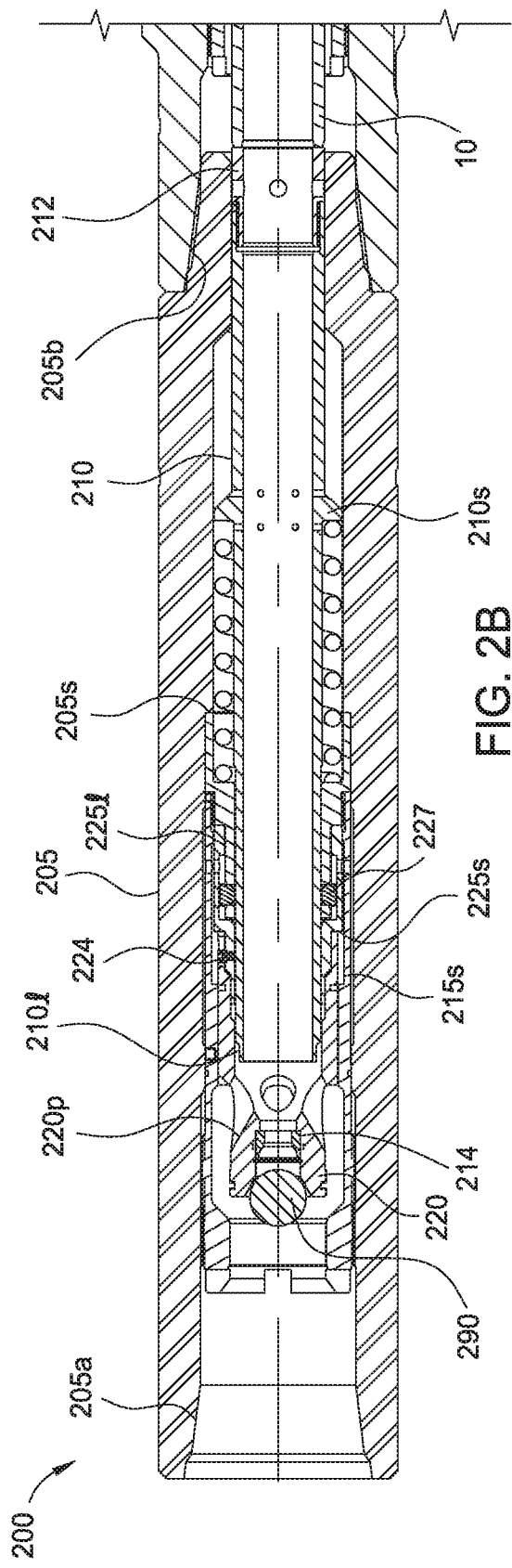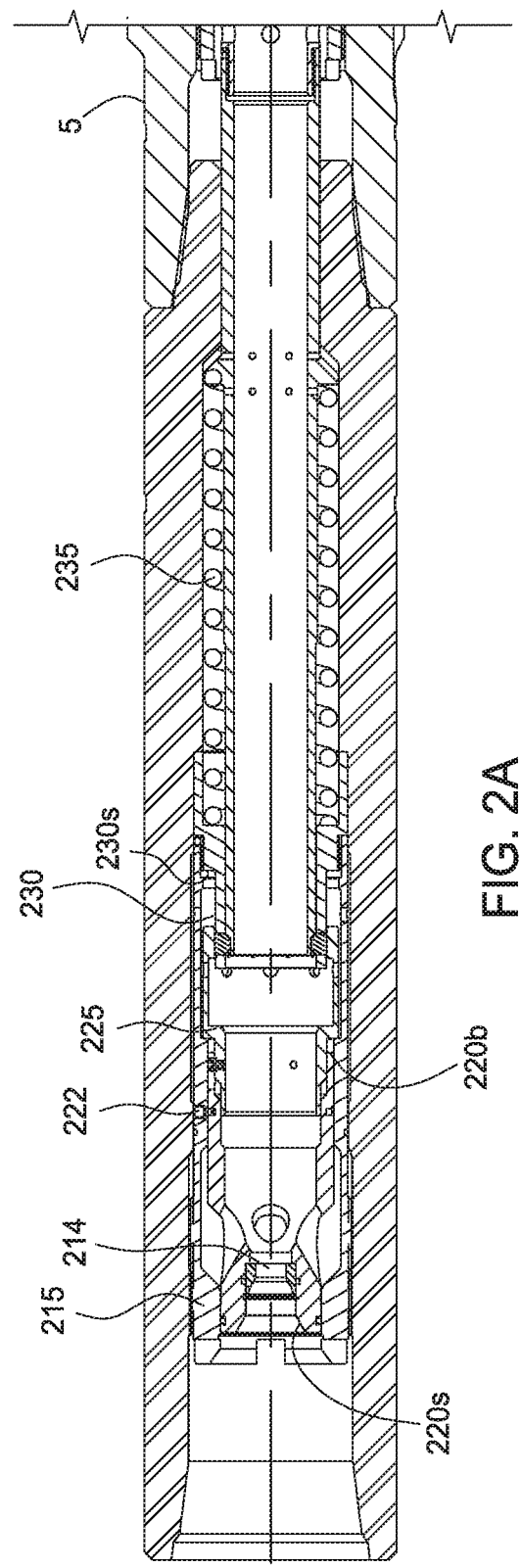
FIG. 2B
FIG. 2A

RFID DEVICE FOR USE DOWNHOLE

BACKGROUND OF THE INVENTION

Field of the Invention

Embodiments of the present invention generally relate to methods and apparatus for operating a downhole tool. Particularly, embodiments to the present invention relate to a radio frequency identification ("RFID") device for operating a downhole tool.

Description of the Related Art

A wellbore is formed to access hydrocarbon bearing formations, e.g. crude oil and/or natural gas, by the use of drilling. Drilling is accomplished by utilizing a drill bit that is mounted on the end of a tubular string, such as a drill string. To drill within the wellbore to a predetermined depth, the drill string is often rotated by a top drive or rotary table on a surface platform or rig, and/or by a downhole motor mounted towards the lower end of the drill string. After drilling to a predetermined depth, the drill string and drill bit are removed and a section of casing is lowered into the wellbore. An annulus is thus formed between the string of casing and the formation. The casing string is temporarily hung from the surface of the well. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

It is common to employ more than one string of casing in a wellbore. In this respect, the well is drilled to a first designated depth with a drill bit on a drill string. The drill string is removed. A first string of casing is then run into the wellbore and set in the drilled out portion of the wellbore, and cement is circulated into the annulus behind the casing string. Next, the well is drilled to a second designated depth, and a second string of casing or liner, is run into the drilled out portion of the wellbore. If the second string is a liner string, the liner is set at a depth such that the upper portion of the second string of casing overlaps the lower portion of the first string of casing. The liner string may then be fixed, or "hung" off of the existing casing by the use of slips which utilize slip members and cones to frictionally affix the new string of liner in the wellbore. The second casing or liner string is then cemented. This process is typically repeated with additional casing or liner strings until the well has been drilled to total depth. In this manner, wells are typically formed with two or more strings of casing/liner of an ever-decreasing diameter.

As more casing/liner strings are set in the wellbore, the casing/liner strings become progressively smaller in diameter to fit within the previous casing/liner string. In a drilling operation, the drill bit for drilling to the next predetermined depth must thus become progressively smaller as the diameter of each casing/liner string decreases. Therefore, multiple drill bits of different sizes are ordinarily necessary for drilling operations. As successively smaller diameter casing/liner strings are installed, the flow area for the production of oil and gas is reduced. Therefore, to increase the annulus for the cementing operation, and to increase the production flow area, it is often desirable to enlarge the borehole below the terminal end of the previously cased/lined borehole. By enlarging the borehole, a larger annulus is provided for subsequently installing and cementing a larger casing/liner string than would have been possible otherwise. Accordingly, by enlarging the borehole below the previously cased borehole, the bottom of the formation can be reached with comparatively larger diameter casing/liner, thereby providing more flow area for the production of oil and/or gas. Underreamers also lessen the equivalent circulation density (ECD) while drilling the borehole.

In order to accomplish drilling a wellbore larger than the bore of the casing/liner, a drill string with an underreamer and pilot bit may be employed. Underreamers may include a plurality of arms which may move between a retracted position and an extended position. The underreamer may be passed through the casing/liner, behind the pilot bit when the arms are retracted. After passing through the casing, the arms may be extended in order to enlarge the wellbore below the casing.

SUMMARY OF THE INVENTION

In one embodiment, a radio-frequency identification device for use in a wellbore includes a housing made of a polymer; and an antenna disposed in the housing.

In one or more of the embodiments described herein, the polymer is selected from the group consisting of an elastomer, a plastic, a rubber, a thermoplastic elastomer, and combinations thereof.

In one or more of the embodiments described herein, the polymer is selected from the group consisting of polyether ether ketone, nylon, polyphenylene sulfide, polytetrafluoroethylene, and combinations thereof.

In one or more of the embodiments described herein, the RFID device includes a fill material disposed in the housing.

In one or more of the embodiments described herein, the fill material is selected from the group consisting of oil, epoxy, and silicone.

In another embodiment, a method of drilling a wellbore includes running a drilling assembly into the wellbore through a casing string, the drilling assembly comprising a tubular string, a MWD tool or LWD tool, a first underreamer, a second underreamer, and a drill bit; injecting drilling fluid through the tubular string and rotating the drill bit, wherein at least one of the first and second underreamers remain locked in the retracted position; sending an instruction signal to the first underreamer, thereby extending the first underreamer; and reaming the wellbore using the first underreamer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B are cross-sections of an underreamer in a retracted and extended position, respectively, according to one embodiment of the present invention.

FIGS. 2A and 2B are cross-sections of a mechanical control module connected to the underreamer in a retracted and extended position, respectively, according to another embodiment of the present invention.

DETAILED DESCRIPTION

FIGS. 1A and 1B are cross-sections of an underreamer 100 in a retracted and extended position, respectively, according to one embodiment of the present invention.

Figure 1C:
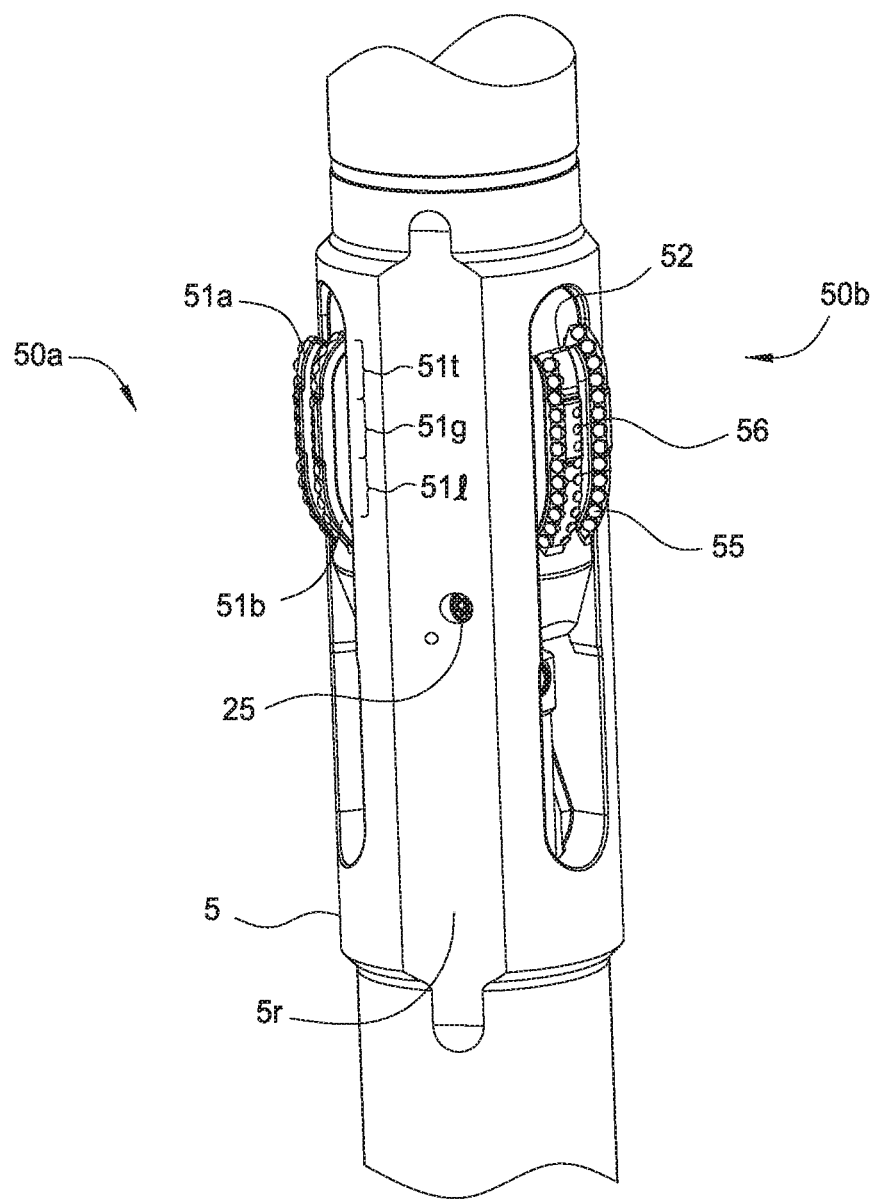
FIG. 1C is an isometric view of arms of the underreamer.

The underreamer 100 may include a body 5, an adapter 7, a piston 10, one or more seal sleeves 15$u,l$, a mandrel 20, and one or more arms 50$a,b$ (see FIG. 1C for 50$b$). The body 5 may be tubular and have a longitudinal bore formed therethrough. Each longitudinal end 5$a,b$ of the body 5 may be threaded for longitudinal and rotational coupling to other members, such as a control module 200 at 5$a$ and the adapter 7 at 5$b$. The body 5 may have an opening 5$o$ formed through a wall thereof for each arm 50$a,b$. The body 5 may also have a chamber formed therein at least partially defined by shoulder 5$s$ for receiving a lower end of the piston 10 and the lower seal sleeve 15$g$. The body 5 may include an actuation profile 5$p$ formed in a surface thereof for each arm 50$a,b$ adjacent the opening 5$o$. An end of the adapter 7 distal from the body (not shown) may be threaded for longitudinal and rotational coupling to another member of a bottomhole assembly (BHA).

The piston 10 may be a tubular, have a longitudinal bore formed therethrough, and may be disposed in the body bore. The piston 10 may have a flow port 10$p$ formed through a wall thereof corresponding to each arm 50$a,b$. A nozzle 14 may be disposed in each port 10$p$ and made from an erosion resistant material, such as a metal, alloy, ceramic, or cermet. The mandrel 20 may be tubular, have a longitudinal bore formed therethrough, and be longitudinally coupled to the lower seal sleeve 15$l$ by a threaded connection. The lower seal sleeve 15$l$ may be longitudinally coupled to the body 5 by being disposed between the shoulder 5$s$ and a top of the adapter 7. The upper seal sleeve 15$u$ may be longitudinally coupled to the body 5 by a threaded connection.

Each arm 50$a,b$ may be movable between an extended and a retracted position and may initially be disposed in the opening 5$o$ in the retracted position. Each arm 50$a,b$ may be pivoted to the piston 10 by a fastener 25. Each arm 50$a,b$ may be biased radially inward by a torsion spring (not shown) disposed around the fastener 25. A surface of the body 5 defining each opening 5$o$ may serve as a rotational stop for a respective blade 50$a,b$, thereby rotationally coupling the blade 50$a,b$ to the body 5 (in both the extended and retracted positions). Each arm 50$a,b$ may include an actuation profile 50$p$ formed in an inner surface thereof corresponding to the profile 5$p$. Movement of each arm 50$a,b$ along the actuation profile 5$p$ may force the arm radially outward from the retracted position to the extended position. Each actuation profile 5$p$, 50$p$ may include a shoulder. The shoulders may be inclined relative to a radial axis of the body 5 in order to secure each arm 50$a,b$ to the body in the extended position so that the arms do not chatter or vibrate during reaming. The inclination of the shoulders may create a radial component of the normal reaction force between each arm and the body 5, thereby holding each arm 50$a,b$ radially inward in the extended position. Additionally, the actuation profiles 5$p$, 50$p$ may each be circumferentially inclined (not shown) to retain the arms 50$a,b$ against a trailing surface of the body defining the opening 5$o$ to further ensure against chatter or vibration.

The underreamer 100 may be fluid operated by drilling fluid injected through the drill string being at a high pressure and drilling fluid and cuttings, collectively returns, flowing to the surface via the annulus being at a lower pressure. A first surface 10$h$ of the piston 10 may be isolated from a second surface 10$l$ of the piston 10 by a lower seal 12$l$ disposed between an outer surface of the piston 10 and an inner surface of the lower seal sleeve 15$g$. The lower seal 12$l$ may be a ring or stack of seals, such as chevron seals, and made from a polymer, such as an elastomer. The high pressure may act on the first surface 10$h$ of the piston via one or more ports formed through a wall of the mandrel 20 and the low pressure may act on the second surface 10$l$ of the piston 10 via fluid communication with the openings 5$o$, thereby creating a net actuation force and moving the arms 50$a,b$ from the retracted position to the extended position. An upper seal 12$u$ may be disposed between the upper seal sleeve 15$u$ and an outer surface of the piston 10 to isolate the openings 5$o$. The upper seal 12$u$ may be a ring or stack of seals, such as chevron seals, and made from a polymer, such as an elastomer. Various other seals, such as o-rings may be disposed throughout the underreamer 100.

In the retracted position, the piston ports 10$p$ may be closed by the mandrel 20 and straddled by seals, such as o-rings, to isolate the ports from the piston bore. In the extended position, the flow ports 10$p$ may be exposed to the piston bore, thereby discharging a portion of the drilling fluid into the annulus to cool and lubricate the arms 50$a,b$ and carry cuttings to the surface. This exposure of the flow ports 10$p$ may result in a drop in upstream pressure, thereby providing an indication at the surface that the arms 50$a,b$ are extended.

FIG. 1C is an isometric view of the arms 50$a,b$. An outer surface of each arm 50$a,b$ may form one or more blades 51$a,b$ and a stabilizer pad 52 between each of the blades. Cutters 55 may be bonded into respective recesses formed along each blade 51$a,b$. The cutters 55 may be made from a super-hard material, such as polycrystalline diamond compact (PDC), natural diamond, or cubic boron nitride. The PDC may be conventional, cellular, or thermally stable (TSP). The cutters 55 may be bonded into the recesses, such as by brazing, welding, soldering, or using an adhesive. Alternatively, the cutters 55 may be pressed or threaded into the recesses. Inserts, such as buttons 56, may be disposed along each pad 52. The inserts 56 may be made from a wear-resistant material, such as a ceramic or cermet (e.g., tungsten carbide). The inserts 56 may be brazed, welded, or pressed into recesses formed in the pad 52.

The arms 50a,b may be longitudinally aligned and circumferentially spaced around the body 5 and junk slots 5r may be formed in an outer surface of the body between the arms. The junk slots 5r may extend the length of the openings 5o to maximize cooling and cuttings removal (both from the drill bit and the underreamer). The arms 50a,b may be concentrically arranged about the body 5 to reduce vibration during reaming. The underreamer 100 may include a third arm (not shown) and each arm may be spaced at one-hundred twenty degree intervals. The arms 50a,b may be made from a high strength metal or alloy, such as steel. The blades 51a,b may each be arcuate, such as parabolic, semi-elliptical, semi-oval, or semi-super-elliptical. The arcuate blade shape may include a straight or substantially straight gage portion 51g and curved leading 51l and trailing 51t ends, thereby allowing for more cutters 55 to be disposed at the gage portion thereof and providing a curved actuation surface against a previously installed casing shoe when retrieving the underreamer 100 from the wellbore should the actuator spring be unable to retract the blades. Cutters 55 may be disposed on both a leading and trailing surface of each blade for back-reaming capability. The cutters in the leading and trailing ends of each blade may be super-flush with the blade. The gage portion may be raised and the gage-cutters flattened and flush with the blade, thereby ensuring a concentric and full-gage hole.

Alternatively, the cutters 55 may be omitted and the underreamer 100 may be used as a stabilizer instead.

FIGS. 2A and 2B are cross-sections of a mechanical control module 200 connected to the underreamer 100 in a retracted and extended position, respectively, according to another embodiment of the present invention. The control module 200 may include a body 205, a control mandrel 210, a piston housing 215, a piston 220, a keeper 225, a lock mandrel 230, and a biasing member 235. The body 205 may be tubular and have a longitudinal bore formed therethrough. Each longitudinal end 205a,b of the body 205 may be threaded for longitudinal and rotational coupling to other members, such as the underreamer 100 at 205b and a drill string at 205a.

The biasing member may be a spring 235 and may be disposed between a shoulder 210s of the control mandrel 210 and a shoulder of the lock mandrel 230. The spring 235 may bias a longitudinal end of the control mandrel or a control module adapter 212 into abutment with the underreamer piston end 10t, thereby also biasing the underreamer piston 210 toward the retracted position. The control module adapter 212 may be longitudinally coupled to the control mandrel 210, such as by a threaded connection, and may allow the control module 200 to be used with differently configured underreamers by changing the adapter 212. The control mandrel 210 may be longitudinally coupled to the lock mandrel 230 by a latch or lock, such as a plurality of dogs 227. Alternatively, the latch or lock may be a collet. The dogs 227 may be held in place by engagement with a lip 225l of the keeper 225 and engagement with a lip 210l of the control mandrel 210. The lock mandrel 230 may be longitudinally coupled to the piston housing 215 by a threaded connection and may abut a body shoulder 205s and the piston housing 215.

The piston housing 215 may be longitudinally coupled to the body 205 by a threaded connection. The piston 220 may be longitudinally coupled to the keeper 225 by one or more fasteners, such as set screws 224, and by engagement of a piston end 220b with a keeper shoulder 225s. The set screws 224 may each be disposed through a respective slot formed through a wall of the piston 220 so that the piston may move longitudinally relative to the keeper 225, the movement limited by a length of the slot. The keeper 225 may be longitudinally movable relative to the body 205, the movement limited by engagement of the keeper shoulder 225s with a piston housing shoulder 215s and engagement of a keeper longitudinal end with a lock mandrel shoulder 230s. The piston 220 may be longitudinally coupled to the piston housing 215 by one or more frangible fasteners, such as shear screws 222. The piston 220 may have a seat 220s formed therein for receiving a closure element, such as a ball 290, plug, or dart. A nozzle 214 may be disposed in a bore of the piston 220 and made from an erosion resistant material, such as a metal, alloy, ceramic, or cermet.

When deploying the underreamer 100 and control module 200 in the wellbore, a drilling operation (e.g., drilling through a casing shoe) may be performed without operation of the underreamer 100. Even though force is exerted on the underreamer piston 10 by drilling fluid, the shear screws 222 may prevent the underreamer piston 10 from extending the arms 50a,b. When it is desired to operate the underreamer 100, the ball 290 is pumped or dropped from the surface and lands in the ball seat 220s. Drilling fluid continues to be injected or is injected through the drill string. Due to the obstructed piston bore, fluid pressure acting on the ball 290 and piston 220 increases until the shear screws 222 are fractured, thereby allowing the piston to move longitudinally relative to the body 205. The piston end 220b may then engage the keeper shoulder 225s and push the keeper 225 longitudinally relative to the body 205, thereby disengaging the keeper lip 225l from the dogs 227. The control mandrel lip 210l may be inclined and force exerted on the control mandrel 210 by the underreamer piston 10 may push the dogs 227 radially outward into a radial gap defined between the lock mandrel 230 and the keeper 225, thereby freeing the control mandrel and allowing the underreamer piston 10 to extend the arms 50a,b. Movement of the piston 220 may also expose a piston housing bore and place bypass ports 220p formed through a wall of the piston 220 in fluid communication therewith.

Figure 3:
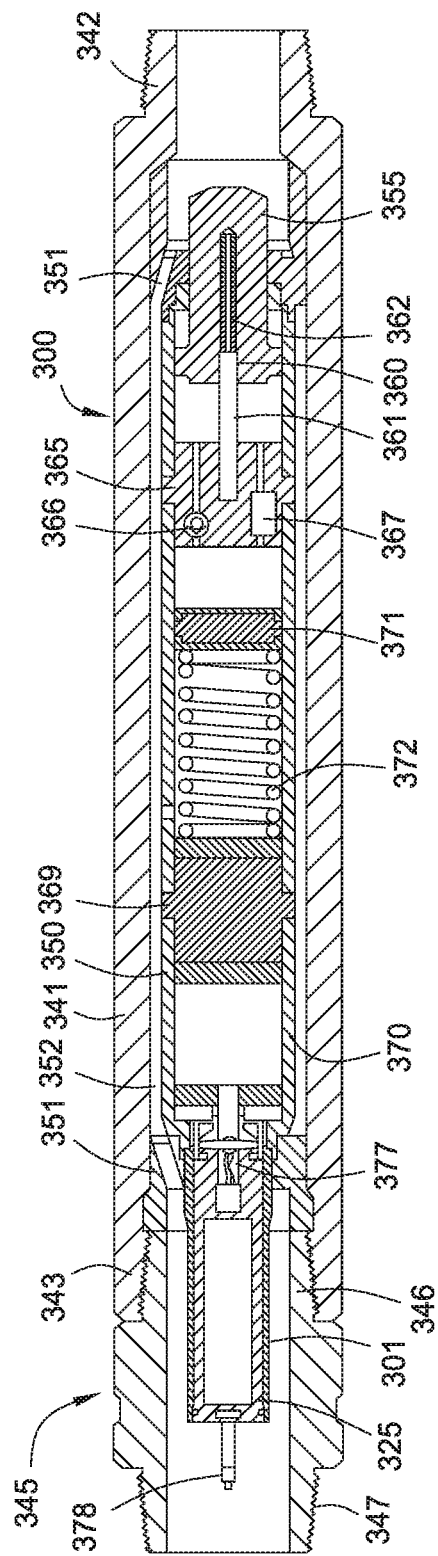
FIG. 3 illustrates an electro-hydraulic control module for use with the underreamer, according to another embodiment of the present invention.

FIG. 3 illustrates an electro-hydraulic control module 300 for use with the underreamer 100, according to another embodiment of the present invention. The control module 300 may be used instead of the control module 200. The control module 300 may include an outer tubular body 341. The lower end of the body 341 may include a threaded coupling, such as pin 342, connectable to the threaded end 5a of the underreamer 100. The upper end of the body 341 may include a threaded coupling, such as box 343, connected to a threaded coupling, such as lower pin 346, of the retainer 345. The retainer 345 may have threaded couplings, such as pins 346 and 347, formed at its ends. The upper pin 347 may connect to a threaded coupling, such as box 408b, of a telemetry sub 400.

The tubular body 341 may house an interior tubular body 350. The inner body 350 may be concentrically supported within the tubular body 341 at its ends by support rings 351. The support rings 351 may be ported to allow drilling fluid flow to pass into an annulus 352 formed between the two bodies 341, 350. The lower end of tubular body 350 may slidingly support a positioning piston 355, the lower end of which may extend out of the body 350 and may engage piston end 10t.

The interior of the piston 355 may be hollow in order to receive a longitudinal position sensor 360. The position sensor 360 may include two telescoping members 361 and 362. The lower member 362 may be connected to the piston 355 and be further adapted to travel within the first member 361. The amount of such travel may be electronically measured. The position sensor 360 may be a linear potentiometer. The upper member 361 may be attached to a bulkhead 365 which may be fixed within the tubular body 350.

The bulkhead 365 may have a solenoid operated valve 366 and passage extending therethrough. The bulkhead 365 may further include a pressure switch 367 and passage. A conduit tube (not shown) may be attached at its lower end to the bulkhead 365 and at its upper end to and through a second bulkhead 369 to provide electrical communication for the position sensor 360, the solenoid valve 366, and the pressure switch 367, to a battery pack 370 located above the second bulkhead 369. The batteries may be high temperature lithium batteries. A compensating piston 371 may be slidingly positioned within the body 350 between the two bulkheads 365,369. A spring 372 may be located between the piston 371 and the second bulkhead 369, and the chamber containing the spring may be vented to allow the entry of drilling fluid.

A tube 301 may be disposed in the connector sub 345 and may house an electronics package 325. The electronics package 325 may include a controller, such as microprocessor, power regulator, and transceiver. Electrical connections 377 may be provided to interconnect the power regulator to the battery pack 370. A data connector 378 may be provided for data communication between the microprocessor 325 and the telemetry sub 400. The data connector may include a short-hop electromagnetic telemetry antenna 378.

Hydraulic fluid (not shown), such as oil, may be disposed in a lower chamber defined by the positioning piston 355, the bulkhead 365, and the body 350 and an upper chamber defined by the compensating piston 371, the bulkhead 365, and the body 350. The spring 372 may bias the compensating piston 371 to push hydraulic oil from the upper reservoir, through the bulkhead passage and valve, thereby extending the positioning piston into engagement with the underreamer piston 10 and biasing the underreamer piston toward the retracted position. Alternatively, the underreamer 100 may include its own return spring and the spring 372 may be used maintain engagement of the positioning piston 355 with the underreamer piston 10. The solenoid valve 366 may be a check valve operable between a closed position where the valve functions as a check valve oriented to prevent flow from the lower chamber to the upper chamber and allow reverse flow therethrough, thereby fluidly locking the underreamer 100 in the retracted position and an open position where the valve allows flow through the passage (in either direction). Alternatively, a solenoid operate shutoff valve may be used instead of the check valve. To allow extension of the underreamer 100, the valve 366 may be opened when drilling fluid is flowing. The underreamer piston 10 may then actuate and push the positioning piston 355 toward the lower bulkhead 365.

The position sensor 360 may measure the position of the piston 355. The controller 325 may monitor the sensor 360 to verify that the piston 355 has been actuated. The differential pressure switch 367 in the lower bulkhead 365 may verify that the underreamer piston 10 has made contact with the positioning piston 355. The force exerted on the piston 355 by the underreamer piston 310 may cause a pressure increase on that side of the bulkhead. Additionally, the underreamer 100 may be modified to be variable (see section mill 1100) and the controller 325 may close the valve 366 before the underreamer arms 50a,b are fully extended, thereby allowing the underreamer 100 to have one or more intermediate positions. Additionally, the controller may lock and unlock the underreamer 100 repeatedly.

In operation, the control module 300 may receive an instruction signal from the surface (discussed below). The instruction signal may direct the control module 300 to allow full or partial extension of the arms 50a,b. The controller 325 may open the solenoid valve 366. If drilling fluid is being circulated through the BHA, the underreamer piston 10 may then extend the arms 50a,b. During extension, the controller 325 may monitor the arms using the pressure sensor 367 and the position sensor 361. Once the arms have reached the instructed position, the controller 325 may close the valve 366, thereby preventing further extension of the arms. The controller 325 may then report a successful extension of the arms or an error if the arms are obstructed from the instructed extension. Once the underreamer operation has concluded, the control module 300 may receive a second instruction signal to retract the arms. If the valve 366 is the check valve, the controller may open the valve or may not have to take action as the check valve may allow for hydraulic fluid to flow from the upper chamber to the lower chamber regardless of whether the valve is open or closed. The controller may simply monitor the position sensor and report successful retraction of the arms. If the valve 366 is a shutoff valve, the instruction signal may include a time at which the rig pumps are shut off or the controller 325 may wait for indication from the telemetry sub that the rig pumps are shut off. The controller may then open the valve to allow the retraction of the arms. Since the control module may not force retraction of the arms 50a,b the control module may be considered a passive control module. Advantageously, the passive control module may use less energy to operate than an active control module (discussed below).

As shown, components of the control module 300 are disposed in a bore of the body 341 and connector 345. Alternatively, components of the control module may be disposed in a wall of the body 341, similar to the telemetry sub 400. The center configured control module 300 may allow for: stronger outer collar connections, a single size usable for different size underreamers or other downhole tools, and easier change-out on the rig floor. The annular alternative arranged control module may provide a central bore therethrough so that tools, such as a ball, may be run-through or dropped through the drill string.

In one embodiment, an optional latch, such as a collet, may be formed in an outer surface of the position piston 355. A corresponding profile may be formed in an inner surface of the interior body 350. The latch may engage the profile when the position piston is in the retracted position. The latch may transfer at least a substantial portion of the underreamer piston 10 force to the interior body 350 when drilling fluid is injected through the underreamer 100, thereby substantially reducing the amount of pressure required in the lower hydraulic chamber to restrain the underreamer piston.

Figure 4:
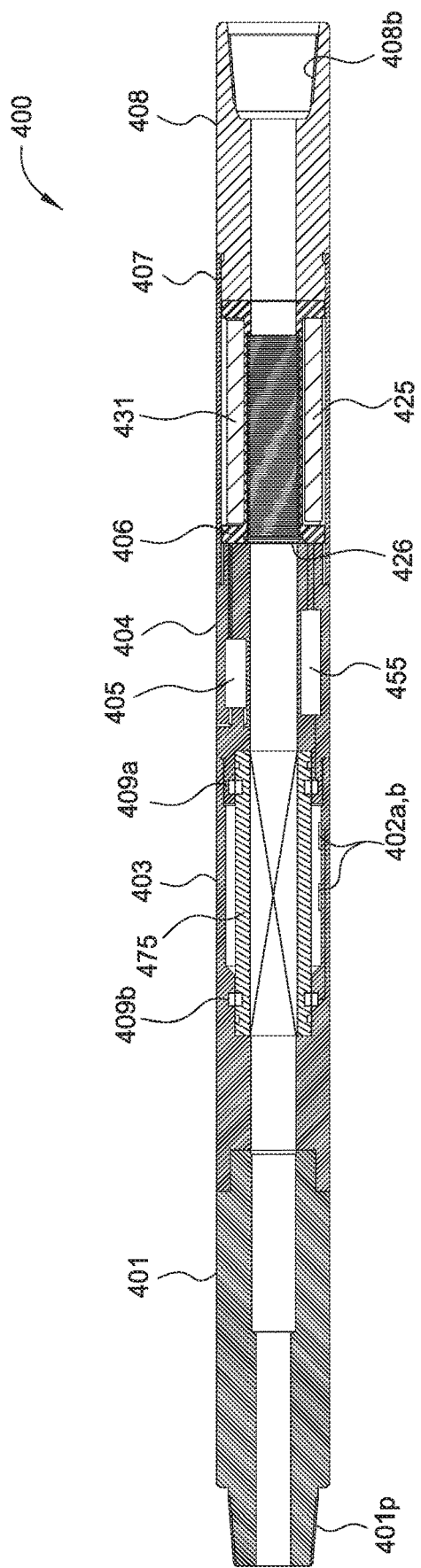
FIG. 4 illustrates a telemetry sub for use with the control module, according to another embodiment of the present invention.

FIG. 4 illustrates a telemetry sub 400 for use with the control module 300, according to another embodiment of the present invention. The telemetry sub 400 may include an upper adapter 401, one or more auxiliary sensors 402a,b, an uplink housing 403, a sensor housing 404, a pressure sensor 405, a downlink mandrel 406, a downlink housing 407, a lower adapter 408, one or more data/power couplings 409a,b, an electronics package 425, an antenna 426, a battery 431, accelerometers 455, and a mud pulser 475. The housings 403, 404, 407 may each be modular so that any of the housings 403, 404, 407 may be omitted and the rest of the housings may be used together without modification thereof. Alternatively, any of the sensors or electronics of the telemetry sub 400 may be incorporated into the control module 300 and the telemetry sub 400 may be omitted.

The adapters 401, 408 may each be tubular and have a threaded coupling 401p, 408b formed at a longitudinal end thereof for connection with the control module 300 and the drill string. Each housing may be longitudinally and rotationally coupled together by one or more fasteners, such as screws (not shown), and sealed by one or more seals, such as o-rings (not shown).

The sensor housing 404 may include the pressure sensor 405 and a tachometer 455. The pressure sensor 405 may be in fluid communication with a bore of the sensor housing via a first port and in fluid communication with the annulus via a second port. Additionally, the pressure sensor 405 may also measure temperature of the drilling fluid and/or returns. The sensors 405, 455 may be in data communication with the electronics package 425 by engagement of contacts disposed at a top of the mandrel 406 with corresponding contacts disposed at a bottom of the sensor housing 406. The sensors 405, 455 may also receive electricity via the contacts. The sensor housing 404 may also relay data between the mud pulser 475, the auxiliary sensors 402a,b, and the electronics package 425 via leads and radial contacts 409a,b.

The auxiliary sensors 402a,b may be magnetometers which may be used with the accelerometers for determining directional information, such as azimuth, inclination, and/or tool face/bent sub angle.

The antenna 426 may include an inner liner, a coil, and an outer sleeve disposed along an inner surface of the downlink mandrel 406. The liner may be made from a non-magnetic and non-conductive material, such as a polymer or composite, have a bore formed longitudinally therethrough, and have a helical groove formed in an outer surface thereof. The coil may be wound in the helical groove and made from an electrically conductive material, such as a metal or alloy. The outer sleeve may be made from the non-magnetic and non-conductive material and may be insulate the coil from the downlink mandrel 406. The antenna 426 may be longitudinally and rotationally coupled to the downlink mandrel 406 and sealed from a bore of the telemetry sub 400.

Figure 4A:
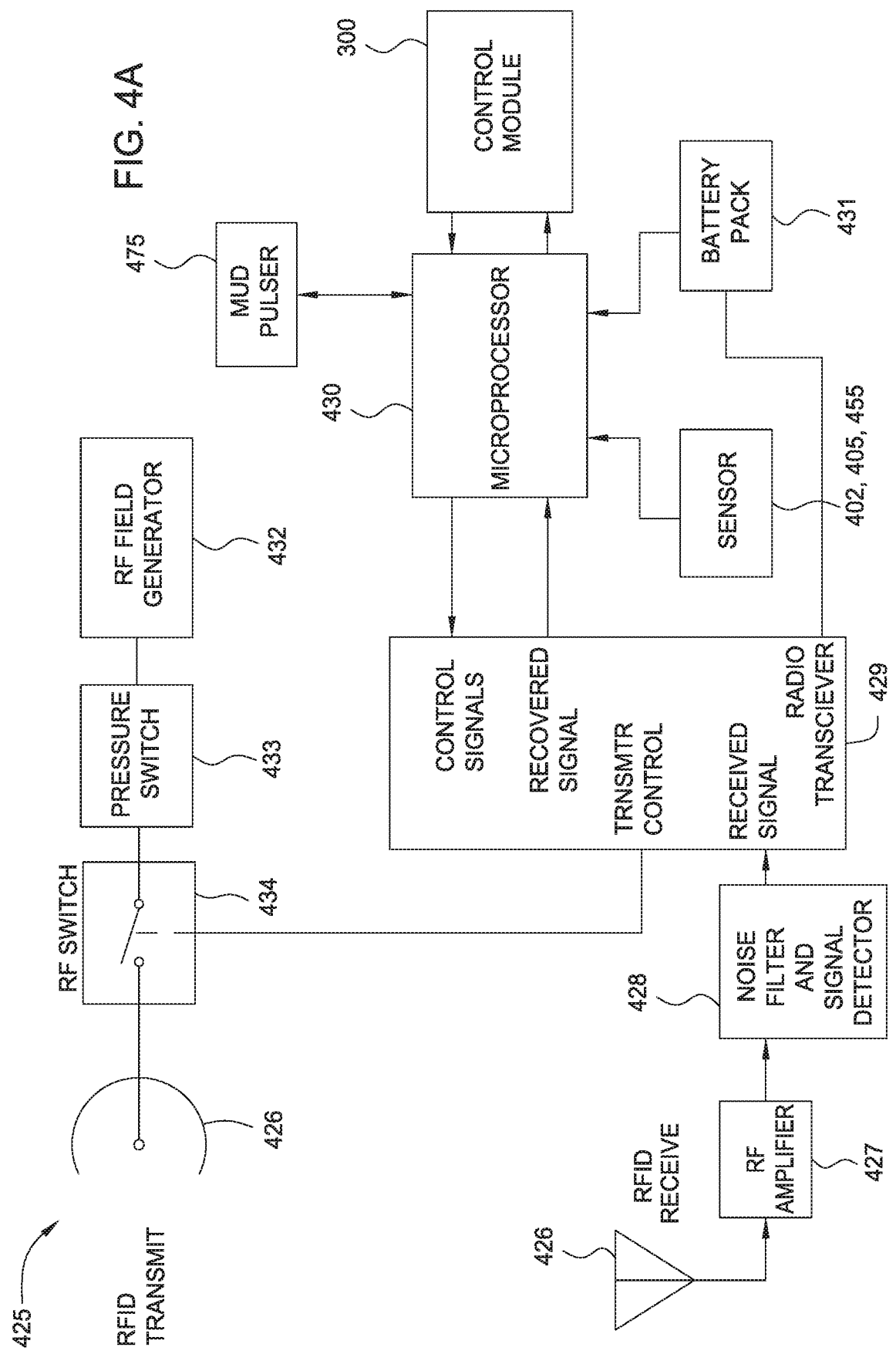
FIG. 4A illustrates an electronics package of the telemetry sub.
Figure 4B:
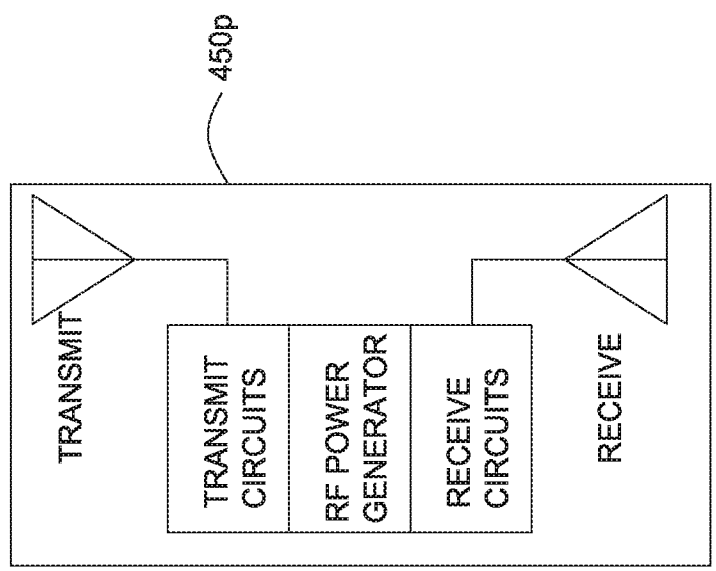
FIG. 4B illustrates an active RFID tag and a passive RFID tag for use with the telemetry sub.
Figure 4B:
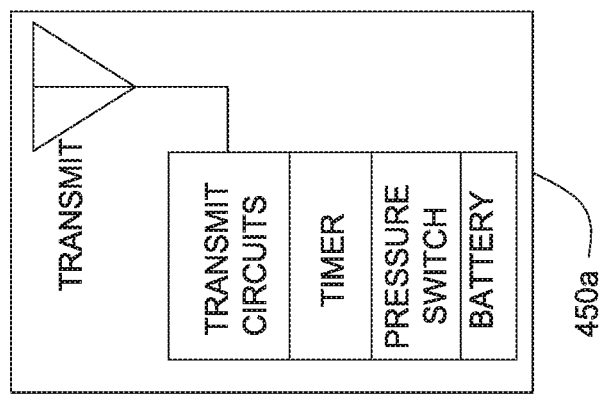

FIG. 4A illustrates the electronics package 425. FIG. 4B illustrates an active RFID tag 450a and a passive RFID tag 450p. The electronics package 425 may communicate with a passive RFID tag 450p or an active RFID tag 450a. Either of the RFID tags 450a,p may be individually encased and dropped or pumped through the drill string. The electronics package 425 may be in electrical communication with the antenna 426 and receive electricity from the battery 431. Alternatively, the data sub 400 may include a separate transmitting antenna and a separate receiving antenna. The electronics package 425 may include an amplifier 427, a filter and detector 428, a transceiver 429, a microprocessor 430, an RF switch 434, a pressure switch 433, and an RF field generator 432.

The pressure switch 433 may remain open at the surface to prevent the electronics package 425 from becoming an ignition source. Once the data sub 400 is deployed to a sufficient depth in the wellbore, the pressure switch 433 may close. The microprocessor 430 may also detect deployment in the wellbore using pressure sensor 405. The microprocessor 430 may delay activation of the transmitter for a predetermined period of time to conserve the battery 431.

When it is desired to operate the underreamer 100, one of the tags 450a,p may be pumped or dropped from the surface to the antenna 426. If a passive tag 450p is deployed, the microprocessor 430 may begin transmitting a signal and listening for a response. Once the tag 450p is deployed into proximity of the antenna 426, the passive tag 450p may receive the signal, convert the signal to electricity, and transmit a response signal. The antenna 426 may receive the response signal and the electronics package 425 may amplify, filter, demodulate, and analyze the signal. If the signal matches a predetermined instruction signal, then the microprocessor 430 may communicate the signal to the underreamer control module 300 using the antenna 426 and the transmitter circuit. The instruction signal carried by the tag 450a,p may include an address of a tool (if the BHA includes multiple underreamers and/or stabilizers, discussed below) and a set position (if the underreamer/stabilizer is adjustable).

If an active tag 450a is used, then the tag 450a may include its own battery, pressure switch, and timer so that the tag 450a may perform the function of the components 432-434. Further, either of the tags 450a,p may include a memory unit (not shown) so that the microprocessor 430 may send a signal to the tag and the tag may record the signal. The signal may then be read at the surface. The signal may be confirmation that a previous action was carried out or a measurement by one of the sensors. The data written to the RFID tag may include a date/time stamp, a set position (the command), a measured position (of control module position piston), and a tool address. The written RFID tag may be circulated to the surface via the annulus.

Alternatively, the control module 300 may be hard-wired to the telemetry sub 400 and a single controller, such as a microprocessor, disposed in either sub may control both subs. The control module 300 may be hard-wired by replacing the data connector 378 with contact rings disposed at or near the pin 347 and adding corresponding contact rings to/near the box 408b of the telemetry sub 400. Alternatively, inductive couplings may be used instead of the contact rings. Alternatively, a wet or dry pin and socket connection may be used instead of the contact rings.

Figure 4D:
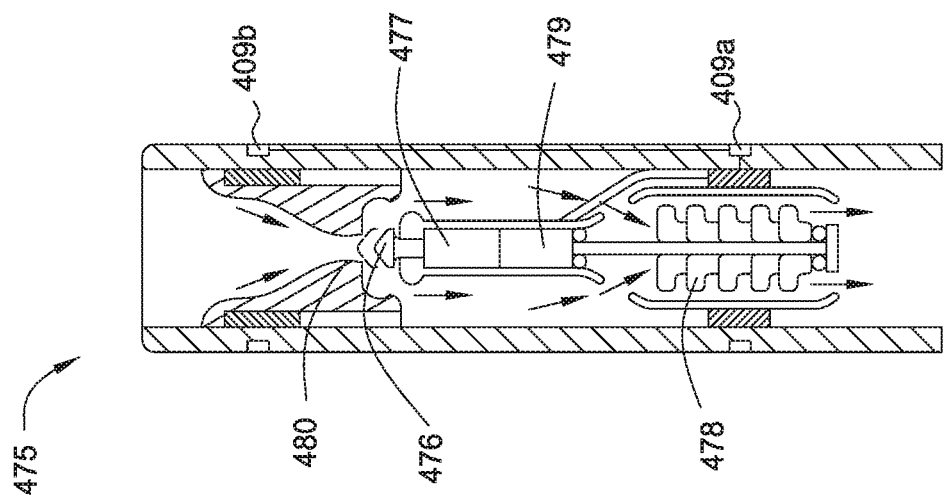
FIG. 4D illustrates a mud pulser of the telemetry sub.
Figure 4C:
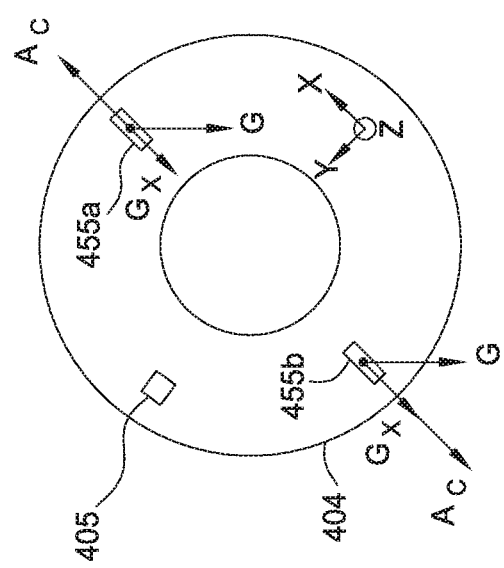
FIG. 4C illustrates accelerometers of the telemetry sub.

FIG. 4C is a schematic cross-sectional view of the sensor sub 404. The tachometer 455 may include two diametrically opposed single axis accelerometers 455a,b. The accelerometers 455a,b may be piezoelectric, magnetostrictive, servo-controlled, reverse pendular, or microelectromechanical (MEMS). The accelerometers 455a,b may be radially X oriented to measure the centrifugal acceleration $A_c$ due to rotation of the telemetry sub 400 for determining the angular speed. The second accelerometer may be used to account for gravity G if the telemetry sub is used in a deviated or horizontal wellbore. Detailed formulas for calculation of the angular speed are discussed and illustrated in U.S. Pat. App. Pub. No. 2007/0107937, which is herein incorporated by reference in its entirety. Alternatively, as discussed in the '937 publication, the accelerometers may be tangentially Y oriented, dual axis, and/or asymmetrically arranged (not diametric and/or each accelerometer at a different radial location). Further, as discussed in the '937 publication, the accelerometers may be used to calculate borehole inclination and gravity tool face. Further, the sensor sub may include a longitudinal Z accelerometer. Alternatively, magnetometers may be used instead of accelerometers to determine the angular speed.

Figure 10:
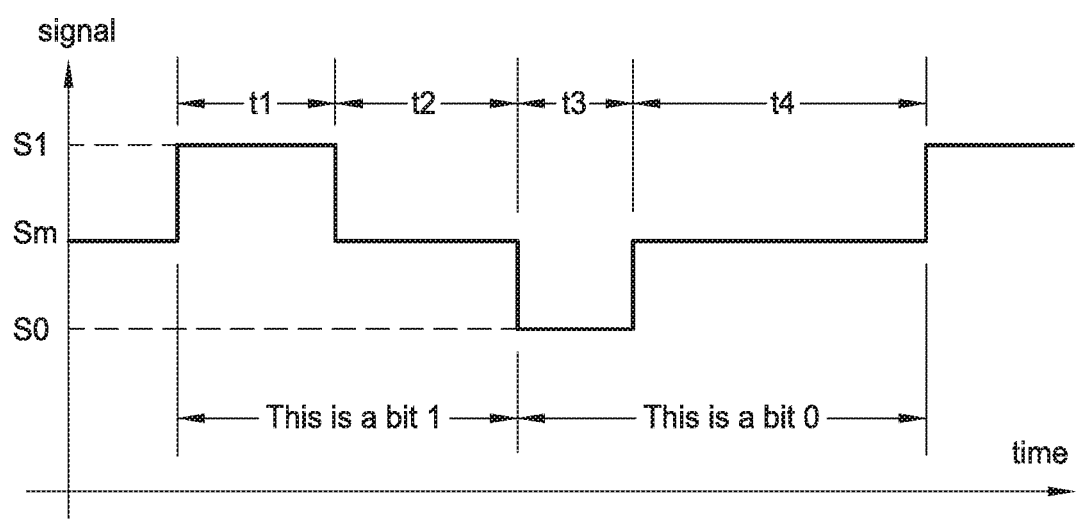
FIG. 10 illustrates an exemplary instruction signal that is not time based.

Instead of using one of the RFID tags 450a,p to activate the underreamer 100, an instruction signal may be sent to the controller 430 by modulating angular speed of the drill string according to a predetermined protocol. An exemplary signal is illustrated in FIG. 10 of the '937 publication. The modulated angular speed may be detected by the tachometer 455. The controller 430 may then demodulate the signal and relay the signal to the control module controller 325, thereby operating the underreamer 100. The protocol may represent data by varying the angular speed on to off, a lower speed to a higher speed and/or a higher speed to a lower speed, or monotonically increasing from a lower speed to a higher speed and/or a higher speed to a lower speed.

FIG. 4D illustrates the mud pulser 475. The mud pulser 475 may include a valve, such as a poppet 476, an actuator 477, a turbine 478, a generator 479, and a seat 480. The poppet 476 may be longitudinally movable by the actuator 477 relative to the seat 480 between an open position (shown) and a choked position (dashed) for selectively restricting flow through the pulser 475, thereby creating pressure pulses in drilling fluid pumped through the mud pulser. The mud pulses may be detected at the surface, thereby communicating data from the microprocessor to the surface. The turbine 478 may harness fluid energy from the drilling fluid pumped therethrough and rotate the generator 479, thereby producing electricity to power the mud pulser. The mud pulser may be used to send confirmation of receipt of commands and report successful execution of commands or errors to the surface. The confirmation may be sent during circulation of drilling fluid. Alternatively, a negative or sinusoidal mud pulser may be used instead of the positive mud pulser 475. The microprocessor may also use the turbine 478 and/or pressure sensor as a flow switch and/or flow meter.

Instead of using one of the RFID tags 450a,p or angular speed modulation to activate the underreamer 100, a signal may be sent to the controller by modulating a flow rate of the rig drilling fluid pump according to a predetermined protocol. Alternatively, a mud pulser (not shown) may be installed in the rig pump outlet and operated by the surface controller to send pressure pulses from the surface to the telemetry sub controller according to a predetermined protocol. The telemetry sub controller may use the turbine and/or pressure sensor as a flow switch and/or flow meter to detect the sequencing of the rig pumps/pressure pulses. The flow rate protocol may represent data by varying the flow rate on to off, a lower speed to a higher speed and/or a higher speed to a lower speed, or monotonically increasing from a lower speed to a higher speed and/or a higher speed to a lower speed. Alternatively, an orifice flow switch or meter may be used to receive pressure pulses/flow rate signals communicated through the drilling fluid from the surface instead of the turbine and/or pressure sensor. Alternatively, the sensor sub may detect the pressure pulses/flow rate signals using the pressure sensor and accelerometers to monitor for BHA vibration caused by the pressure pulse/flow rate signal.

Figure 5A:
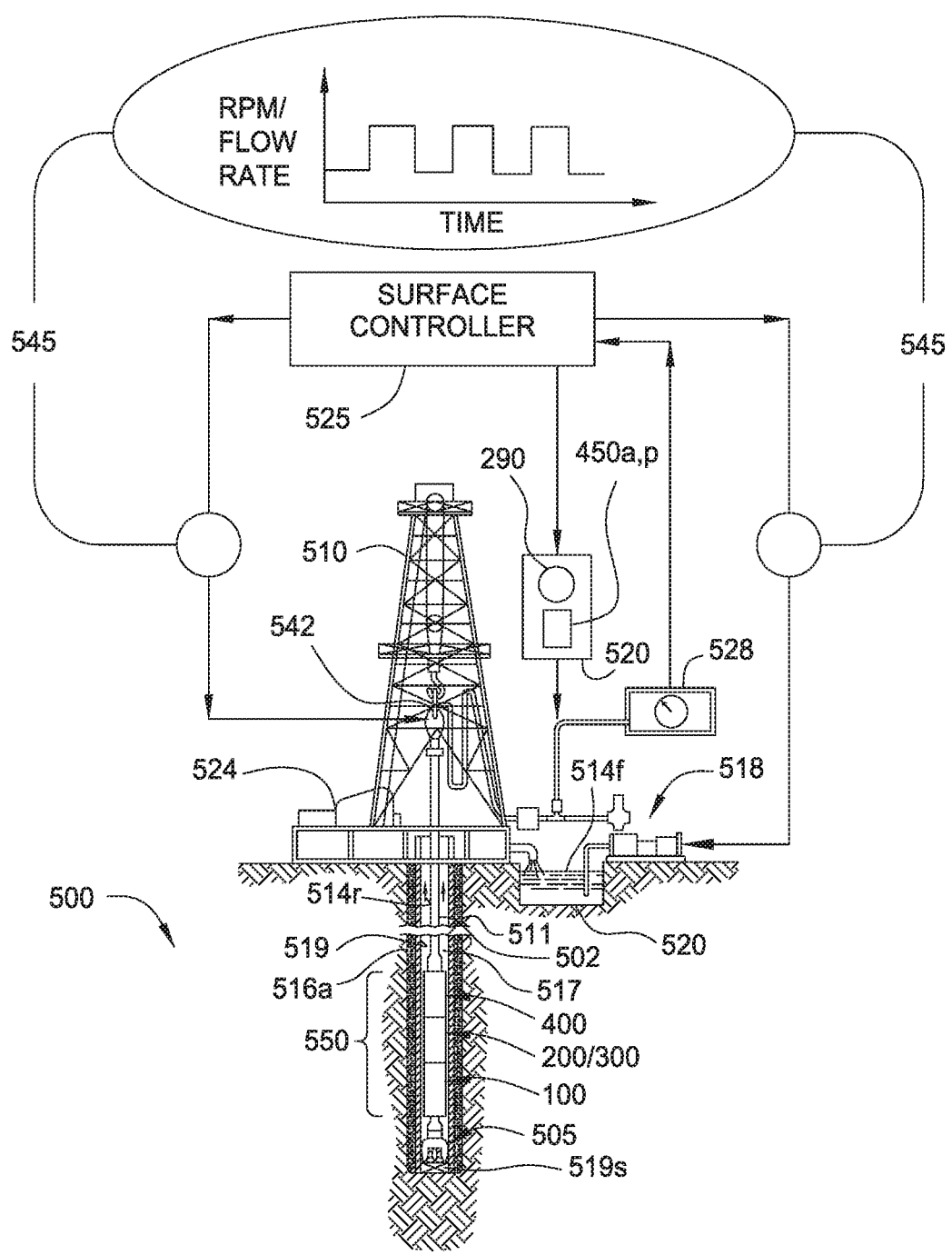
FIGS. 5A and 5B illustrate a drilling system and method utilizing the underreamer, according to another embodiment of the present invention.
Figure 5B:
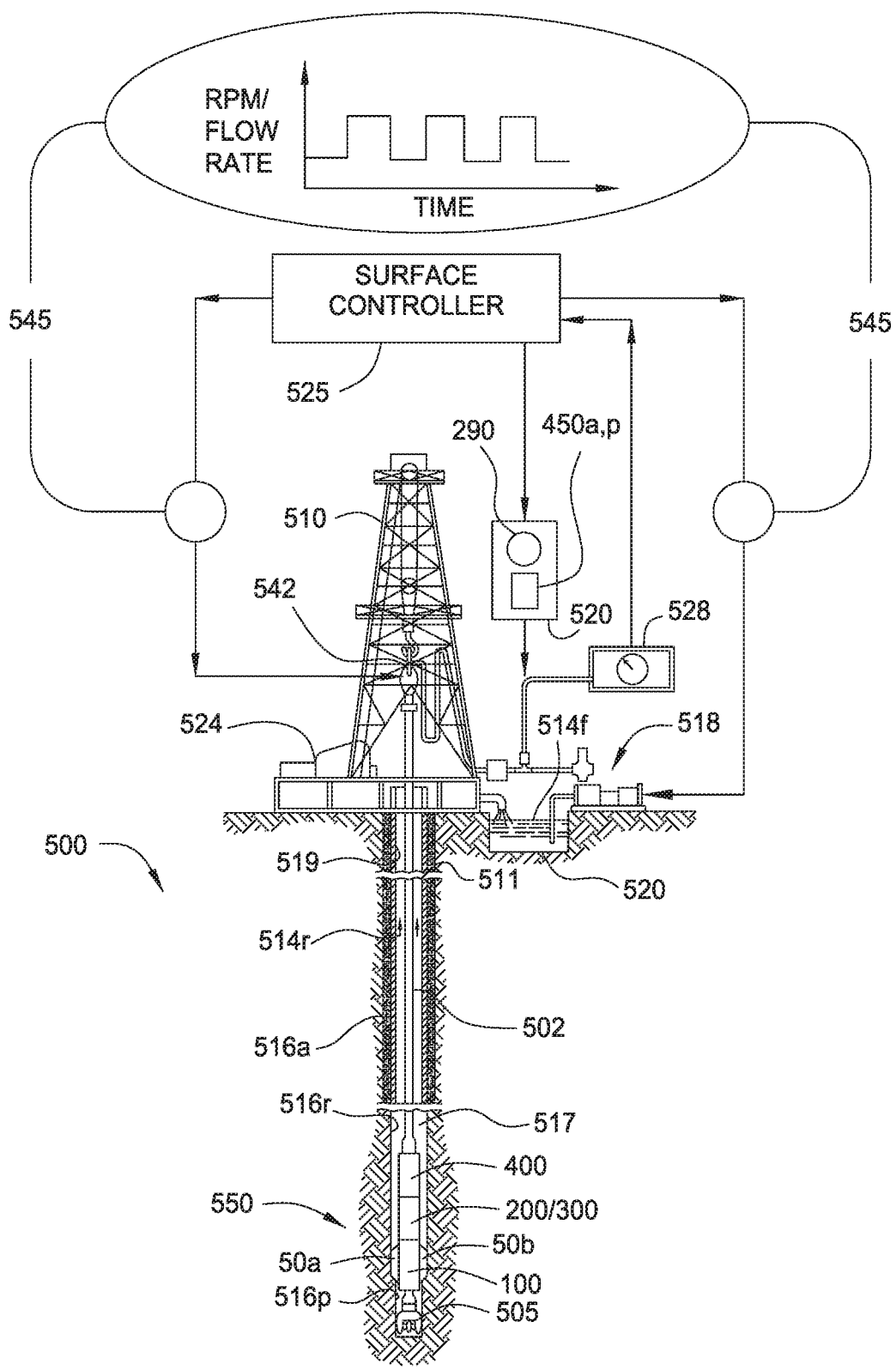

FIGS. 5A and 5B illustrate a drilling system 500 and method utilizing the underreamer 100, according to another embodiment of the present invention.

The drilling system 500 may include a drilling derrick 510. The drilling system 500 may further include drawworks 524 for supporting a top drive 542. The top drive 542 may in turn support and rotate a drilling assembly 500. Alternatively, a Kelly and rotary table (not shown) may be used to rotate the drilling assembly instead of the top drive. The drilling assembly 500 may include a drill string 502 and a bottomhole assembly (BHA) 550. The drill string 502 may include joints of threaded drill pipe connected together or coiled tubing. The BHA 550 may include the telemetry sub 400, the control module 300, the underreamer 100, and a drill bit 505. A rig pump 518 may pump drilling fluid, such as mud 514f, out of a pit 520, passing the mud through a stand pipe and Kelly hose to a top drive 542. The mud 514f may continue into the drill string, through a bore of the drill string, through a bore of the BHA, and exit the drill bit 505. The mud 514f may lubricate the bit and carry cuttings from the bit. The drilling fluid and cuttings, collectively returns 514r, flow upward along an annulus 517 formed between the drill string and the wall of the wellbore 516a/casing 519, through a solids treatment system (not shown) where the cuttings are separated. The treated drilling fluid may then be discharged to the mud pit for recirculation.

The drilling system may further include a launcher 520, surface controller 525, and a pressure sensor 528. The pressure sensor 528 may detect mud pulses sent from the telemetry sub 400. The surface controller 525 may be in data communication with the rig pump 518, launcher 520, pressure sensor 528, and top drive 542. The rig pump 518 and/or top drive 542 may include a variable speed drive so that the surface controller 525 may modulate 545 a flow rate of the rig pump 518 and/or an angular speed (RPM) of the top drive 542. The modulated signal may be a square wave, trapezoidal wave, or sinusoidal wave. Alternatively, the controller 545 may modulate the rig pump and/or top drive by simply switching them on and off.

A first section of a wellbore 516a has been drilled. A casing string 519 has been installed in the wellbore 516a and cemented 511 in place. A casing shoe 519s remains in the wellbore. The drilling assembly 500 may then be deployed into the wellbore 516a until the drill bit 505 is proximate the casing shoe 519s. The drill bit 505 may then be rotated by the top drive and mud injected through the drill string by the rig pump. Weight may be exerted on the drill bit, thereby causing the drill bit to drill through the casing shoe. The underreamer 100 may be restrained in the retracted position by the control module 200/300. Once the casing shoe 519s has been drilled through and the underreamer 100 is in a pilot section 516p of the wellbore, the underreamer 100 may be extended. If the control module 200 is used, then the surface controller 525 may instruct the launcher 520 to deploy the ball 290. If the control module 300 is used, then the surface controller 525 may instruct the launcher 520 to deploy one of the RFID tags 450a,p; modulate angular speed of the top drive 545; or flow rate of the rig pump 518, thereby conveying an instruction signal to extend the underreamer 100. Alternatively, the ball 290/RFID tags 450a,p may be manually launched. The telemetry sub 400 may receive the instruction signal; relay the instruction signal to the control module 300 allow the arms 50a,b to extend; and send a confirmation signal to the surface via mud pulse. The pressure sensor 528 may receive the mud pulse and communicate the mud pulse to the surface controller. The underreamer 100 may then ream the pilot section 516p into a reamed section 516r, thereby facilitating installation of a larger diameter casing/liner upon completion of the reamed section.

Alternatively, instead of drilling through the casing shoe, a sidetrack may be drilled or the casing shoe may have been drilled during a previous trip.

Once drilling and reaming are complete, it may be desirable to perform a cleaning operation to clear the wellbore 516r of cuttings in preparation for cementing a second string of casing. A second instruction signal may be sent to the telemetry sub 400 commanding retraction of the arms. The rig pump may be shut down, thereby allowing the control module 300 to retract the arms and lock the arms in the retracted position. Once the arms are retracted, the rig pump may resume circulation of drilling fluid and the telemetry sub may confirm retraction of the arms via mud pulse. Once the confirmation is received at the surface, the cleaning operation may commence. The cleaning operation may involve rotation of the drill string at a high angular velocity that may otherwise damage the arms if they are extended. The drilling assembly may be removed from the wellbore during the cleaning operation. Additionally, the control module 300 may be commanded to retract and lock the arms for other wellbore operations, such as underreaming only a selected portion of the wellbore. Alternatively, the drill string may remain in the wellbore during the cleaning operation and then the arms may be re-extended by sending another instruction signal and the wellbore may be back-reamed while removing the drill string from the wellbore. The arms may then be retracted again when reaching the casing shoe. Alternatively, the cleaning operation may be omitted. Alternatively or additionally, the cleaning operation may be occasionally or periodically performed during the drilling and reaming operation.

Figure 6:
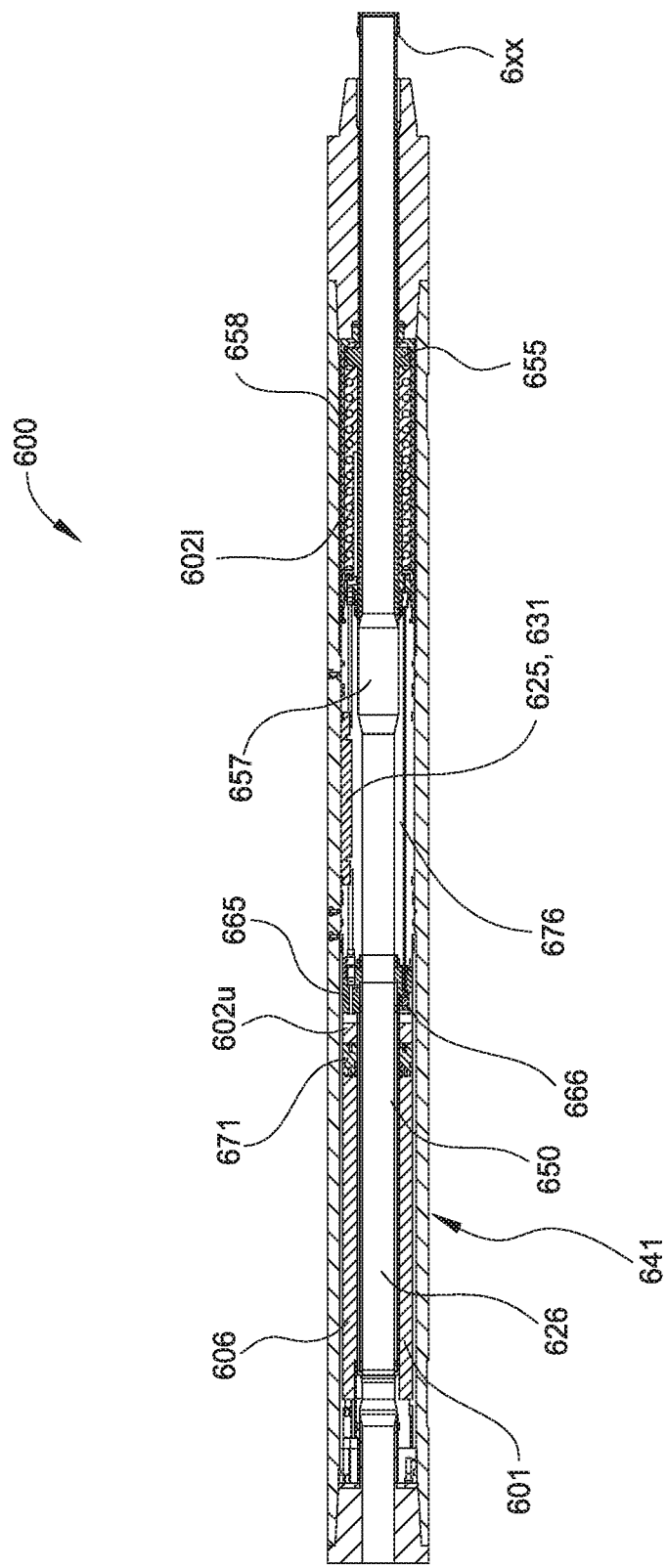
FIG. 6 illustrates another embodiment of a control module for use with the underreamer, according to another embodiment of the present invention.

FIG. 6 illustrates a portion of an alternative control module 600 for use with the underreamer 100, according to another embodiment of the present invention. The rest of the control module 600 may be similar to the control module 300. The control module 600 may be used instead of the control module 300.

The control module 600 may include an outer tubular body 641. The lower end of the body 641 may include a threaded coupling, such as a pin, connectable to the threaded end 5a of the underreamer 100. The upper end of the body 641 may include a threaded coupling, such as a box, connected to a threaded coupling, such as the drill string.

The tubular body 641 may house an interior tubular body 650. The inner body 650 may be concentrically supported within the outer tubular body 641. In one embodiment, drilling fluid may be allowed to flow into an annulus formed between the two bodies 641, 650. The interior tubular body 650 may include a central bore 657. The lower end of the central bore 657 may slidingly support a positioning piston 655, the lower end of which may extend out of the interior tubular body 650 and may engage piston end 10t. A flange of the piston 655 sealingly engages an inner surface of the interior tubular body 650. A lower hydraulic chamber 602l is defined in an annular area between the piston 655 and the interior tubular body 650. A biasing member 658, such as a spring, may be used to bias the piston 655 in the extended position, as shown. The lower end of the piston 655 may be coupled to an extension sleeve. In another embodiment, the extension sleeve is integral with the piston 655. A bulkhead 665 may be coupled to the upper end of the interior tubular body 650. An inner conduit 601 is coupled between the bulkhead 665 and the upper end of the outer tubular body 641. The inner conduit 601 fluidly communicates with the bore of the drill string, the bore 657 of the inner tubular body 650, and a bore of the piston 655. The bulkhead 665 may have a solenoid operated valve 666 and a first passage 676 extending therethrough. The first passage 676 is in selective fluid communication with a passage in the interior tubular body 650 and allows selective fluid communication between the lower hydraulic chamber 602l and the upper hydraulic chamber 602u. The batteries 631 may be high temperature lithium batteries. The bulkhead 665 may further include pressure sensors for measuring the pressure in the lower hydraulic chamber 602l and the pressure in the upper hydraulic chamber. In yet another embodiment, the second passage is exposed to the upper and lower chambers and may include a check valve operable to allow fluid flow from the upper chamber to the lower chamber and prevent fluid flow from the lower chamber to the upper chamber A compensating piston 671 may be slidingly positioned within an annular area between the interior tubular body 650 and the inner conduit 601. An upper hydraulic chamber 602u is defined in an annular area between the inner conduit 601 and the interior tubular body 650 and axially between the compensating piston 671 and the bulkhead 665. A compensating chamber 606 located above the compensating piston 671 can fluidly communicate with the fluid in the drill string. The compensating piston 671 equalizes pressure between drilling fluid in the compensating chamber 606 and the upper chamber 602u.

The interior tubular body 650 may house the battery 631 and an electronics package 625. The electronics package 625 may include a controller, such as microprocessor, power regulator, and transceiver. The controller may be configured to receive data from the sensors. The electronics package may further include sufficient electronic components for RFID communication with either an active RFID tag or a passive RFID tag. The module 600 also includes an antenna 626 for RFID communication. Alternately, the RFID tag could be replaced with a drilling fluid containing various densities of paramagnetic material. Detection of the paramagnetic material may cause a downhole tool to perform a predetermined function.

In one embodiment, the solenoid valve 666 is operable to prevent flow from the lower chamber to the upper chamber in the closed position. Suitable solenoid valves 666 include a check valve or a shutoff valve. Similar to the control module 300, the position piston 655 may prevent the underreamer piston 10 from extending the arms 50a,b while drilling fluid 514f is pumped through the control module 600 and the underreamer 100 due to the closed check valve 656. The control module 600 may further include a position sensor, such as a Hall sensor and magnet, which may be monitored by the controller 625 to allow extension of the arms to one or more intermediate positions and/or to confirm full extension of the arms. Alternatively, the position sensor may be a linear voltage differential transformer (LVDT).

In operation, when the controller of the control module 625 may receive a signal instructing retraction of the arms 50a,b, the controller 625 may open the solenoid check valve 666 so oil may flow through the hydraulic passage from the upper chamber to the lower chamber. In one embodiment, the signal is sent using a RFID tag. After the solenoid valve opens, the position piston 655 is allowed to retract, thereby allowing the underreamer arms to extend. Once the controller 625 detects that the position piston 655 is in the instructed position via the position sensor 611, 612, the controller may close the solenoid check valve.

The control module 600 may optionally include an actuator so that the control module 600 may actively move the underreamer piston 10 while the rig pump 518 is injecting drilling fluid through the control module 600 and the underreamer 100. The actuator may be a hydraulic pump in communication with the upper 602u and lower 602l hydraulic chambers via a hydraulic passage and operable to pump the hydraulic fluid from the upper chamber 602u to the lower chamber 602l while being opposed by the underreamer piston 10. An electric motor may drive the hydraulic pump. The electric motor may be reversible to cause the hydraulic pump to pump fluid from the lower chamber 602l to the upper chamber 602u. The active control module 600 may receive an instruction signal from the surface and operate the underreamer 100 without having to wait for shut down of the rig pump 518. Alternatively, the underreamer piston force may be reduced by decreasing flow rate of the drilling fluid or shutting off the rig pump before or during sending of the instruction signal.

Instead of using one of the RFID tags 450a,p, a signal may be sent to the controller 625 by modulating a flow rate of the rig drilling fluid pump according to a predetermined protocol. Alternatively, a mud pulser (not shown) may be installed in the rig pump outlet and operated by the surface controller to send pressure pulses from the surface to the control module 600 according to a predetermined protocol. The module controller 625 may use one or more pressure sensor as a flow switch and/or flow meter to detect the sequencing of the pressure pulses. The flow rate protocol may represent data by varying the flow rate on to off, a lower speed to a higher speed and/or a higher speed to a lower speed, or monotonically increasing from a lower speed to a higher speed and/or a higher speed to a lower speed. Alternatively, an orifice flow switch or meter may be used to receive pressure pulses/flow rate signals communicated through the drilling fluid from the surface instead of the pressure sensor. Alternatively, the control module may detect the pressure pulses/flow rate signals using the pressure sensor and accelerometers to monitor for BHA vibration caused by the pressure pulse/flow rate signal.

In one embodiment, the flow rate signal may include a synchronization portion and a command portion. The synchronization portion may be a flow rate pattern that, when detected, indicates to the control module 600 that a new command is to be sent. For example, the synchronization portion may involve flowing the fluid at or above a first flow rate and then at or below a second flow rate for the same period of time for two cycles. The synchronization portion prevents the receiver, e.g., the control module, from receiving the wrong signal. The command portion may be a flow rate pattern that, when detected, instructs the control module 600 to perform certain functions. The command portion may, for example, instruct the control module 600 to keep the solenoid valve open for a particular time period before closing. In another embodiment, the command portion may instruct the control module 600 to close the solenoid valve or close for a period of time before opening. In another embodiment, the signal may comprise modulating angular speed of the drill string instead of the flow rate. The angular speed may be measured using one or more accelerometers. The speed signal may also include a synchronization portion and a command portion. In yet another embodiment, the signal may involve modulation of a combination of flow rate and angular speed. For example, the synchronization portion may involve modulation of flow rate and the command portion may involve modulation of speed, and vice versa. In yet another embodiment, other types of modulation protocols are also contemplated. Exemplary modulation protocols include pulse width modulation, amplitude based modulation, phase shift key modulation, and frequency shift key modulation. For example, amplitude based modulation may be used by modulating the flow rate between three different flow rates. In this respect, time is not a constraint in amplitude based modulation.

Figure 7:
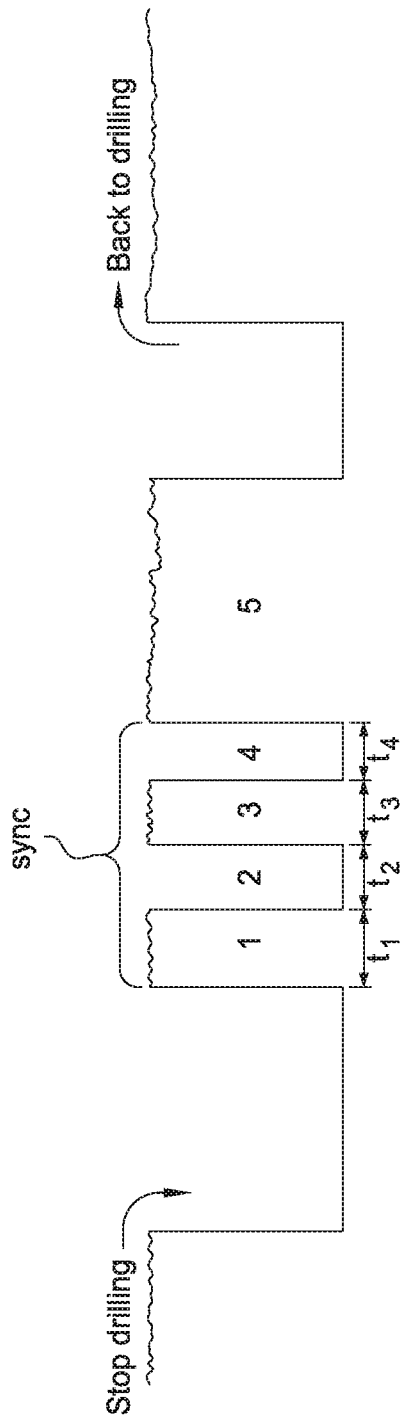
FIG. 7 illustrates an exemplary instruction signal.

FIG. 7 illustrates an exemplary flow rate modulation pattern for communicating with the control module. After drilling is stopped, the fluid flow rate is reduced to a first flow rate. To start the synchronization portion, the flow rate is increased to a second flow rate and held for a specific time period (t1), as represented by area "1". Then, the flow rate is reduced to the first flow rate and held for the same period of time (t2), as represented by area "2". It is contemplated that any suitable time period may be used, for example, 30 seconds, 1 minute, 1.5 minutes, any time period from 15 seconds to 5 minutes, or any time period from 15 seconds to 20 minutes. The cycle is repeated to complete the synchronization portion. The command portion instructs the control module to keep the solenoid valve for a particular time period, depending on the instruction. The valve open time period may be communicated by maintaining the flow rate for a particular time period, which is represented by area "5" in the signal of FIG. 5. In this example, area 5 is equal to $t*2n$, where n is an integer and each incremental increase may equate to an additional time period of valve being open. Exemplary time periods of keeping the valve open may be any suitable time period from 15 minutes to 2 hours, such as 30 minutes or 1 hour. After the command portion, the flow rate is reduced for a period of time, and drilling may commence again. In another embodiment, command portion may comprise a particular pulse generated within the time period. For example, area "5" may represent four different time periods. If a pulse, or change in flow rate, occurs in the first time period, then the control module would be instructed to keep the solenoid valve open for the first time period, such as one hour. However, if the pulse occurs in the fourth time period, then the control module would know to keep the solenoid valve open for four time periods, such as four hours.

In one embodiment, one or more underreamers may be used in a bottom hole assembly ("BHA"). In one exemplary arrangement, the BHA may include a drill bit at the bottom, then a 3D rotary steerable system, a lower underreamer, a measurement while drilling ("MWD") tool, a logging while drilling ("LWD") tool, an upper underreamer, and other suitable components. In this example, the lower and upper underreamers may be operated by a signal via RFID tag, flow rate modulation, pressure modulation, and/or angular speed modulation. The upper underreamer may be used during drilling to underream the drilled borehole. In one example, the upper underreamer is actuated using a RFID tag. After drilling, the lower underreamer may be used to underream the rat-hole. In another embodiment, the lower underreamer could be mounted just above the drill-bit, or anywhere below a MWD tool, a LWD tool, a pulser, a turbine, a filter, or combinations thereof.

To actuate the lower underreamer, a RFID tag or paramagnetic material may be released into the drill string. The RFID tag may flow past the upper underreamer, the LWD tool, and MWD tool, before being picked up by the lower underreamer. The RFID tag is configured to only actuate the lower underreamer, not the upper underreamer.

In another embodiment, the lower underreamer may be actuated by sending a flow rate or pressure signal such as the signal shown in FIG. 7. As the flow rate is modulated, the pressure in the upper hydraulic chamber 602u of the control module also changes. Pressure in the chamber 602u may be monitored by the controller to identify the synchronization portion and the command portion. In another embodiment, the pressure in the lower chamber and/or the upper chamber may be monitored. In yet another embodiment, a pressure differential between both chambers may be monitored to identify the synchronization signal. In another embodiment, a pressure transducer may be positioned in the bore of the tool to monitor changes in flow rate, pressure, or combinations thereof.

Upon receiving the command portion of the signal, the controller opens the solenoid valve 666 to allow hydraulic fluid to flow from the lower chamber 602l to the upper chamber 602u. In turn, the arms of the underreamer are allowed extend in response to fluid pressure. Extension of the arms causes the piston to retract and forces the hydraulic fluid to flow from the lower chamber 602*l* to the upper chamber 602*u*. The hydraulic fluid causes the compensating piston to move in a direction that increases the size of the upper chamber 602*u*. The command portion may also instruct the controller to close the solenoid valve after a specified period of time that is sufficient to allow the completion of the reaming process. After reaming, the drilling fluid pressure is relieved to allow the arms of the underreamer to retract. As a result, the spring in the control module biases the piston to the extended position. Also, the hydraulic fluid in the upper chamber is allowed to flow back into the lower chamber. Drilling fluid pressure in the drill string may also act on the compensating piston to facilitate the flow of hydraulic fluid back to the lower chamber.

Figure 8:
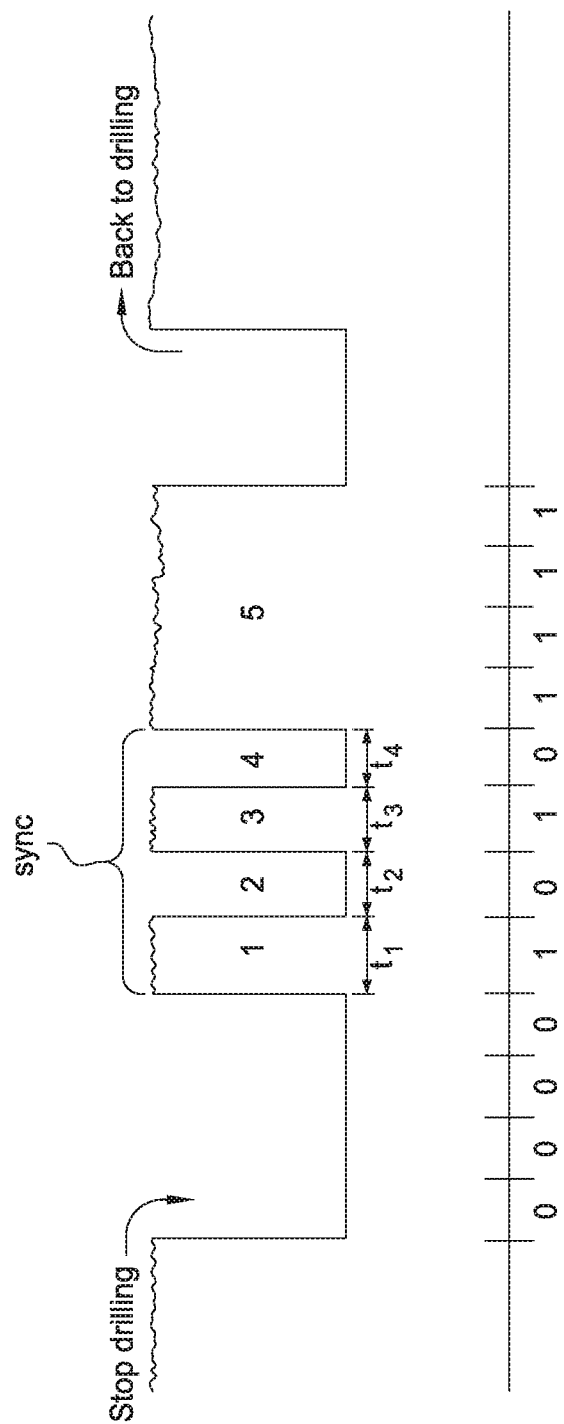
FIG. 8 illustrates an exemplary digital instruction signal.

In yet another embodiment, the flow rate modulation signal may be expressed as a digital signal. For example, referring back to FIG. 7, the flow rate signal may be divided into several equal time periods. Because the flow rate is modulated between two different flow rates, then each of the time periods may be represented by either "0" or "1". FIG. 8 is a digital representation of the signal in FIG. 7. In one embodiment, the flow rate may be modulated by operating the pump between an "on" state and an "off" state. In another embodiment, the flow rate may be modulated between a "low" flow rate and a "high" flow rate, both of which are positive flow rates. The digital signal may be used to control the pump to modulate the flow rate. In yet another embodiment, the signal may be modulated using amplitude based modulation, wherein the flow rate or angular speed is modulated between two different amplitude thresholds. As a result, the digital signal may be represented based on changes in the amplitudes of the flow rates. Other suitable modulated signals include phase shift key modulation, pulse width modulation, and frequency shift key modulation.

Figure 9:
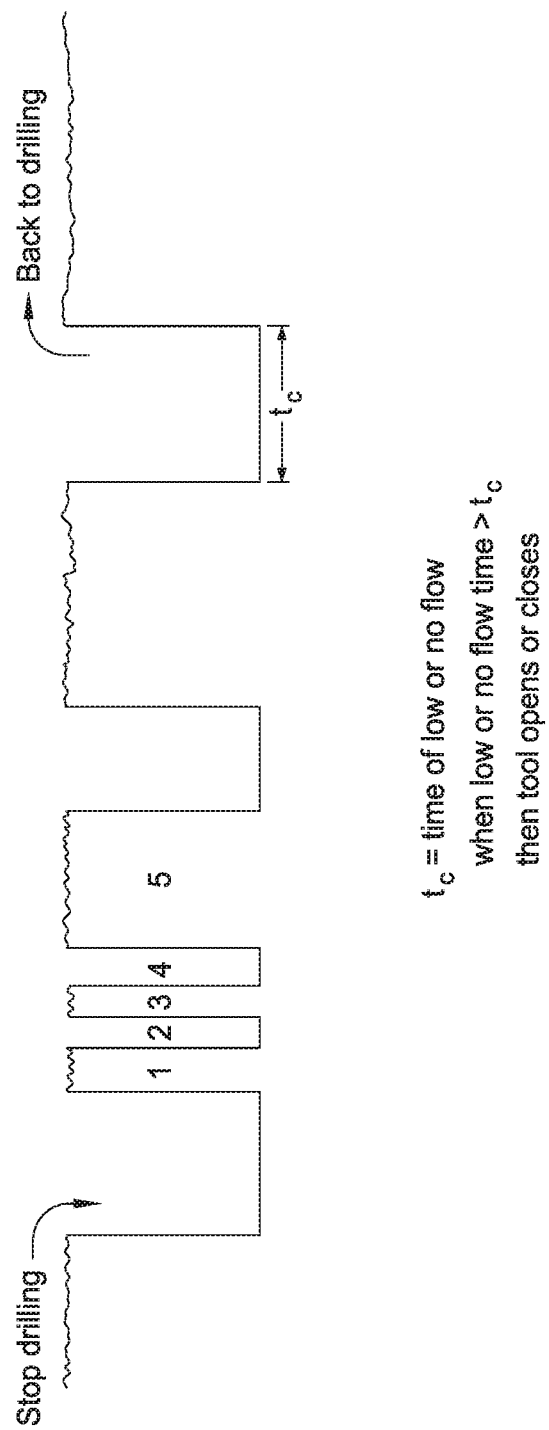
FIG. 9 illustrates another exemplary instruction signal.

In yet another embodiment, the command portion of the signal may instruct the controller to perform a particular function if certain conditions are observed. In the example shown in FIG. 9, the command portion of the signal carries the instruction to close the valve if the flow rate is at or below the lower threshold for than a predetermined period of time. In one example, the command portion may instruct the controller to close the solenoid valve is low or no drilling fluid flow is observed for 15 minutes or any suitable time period, such as between 2 minutes to 30 minutes. In another embodiment, the command portion may cause the controller to open the solenoid valve if this condition is observed.

FIG. 10 illustrates an exemplary instruction signal that is not time based. In this example, to transmit a bit 1, the amplitude of the signal, which may be flow rate or rotational speed, is changed from S1 to Sm. To transmit a bit 0, the amplitude of the signal is changed from Sm to S0. Thus, bit 1 and bit 0 may be represented by only varying the amplitude. As a result, the time (t1, t2, t3, t4) at which the signal is maintained at these values (S1, Sm, S0) is not critical. In this respect, the time values (t1, t2, t3, t4) do not need to be equal, thereby eliminating possible errors due to the operator or system dynamic behavior.

In another embodiment, a downhole tool controller may be designed to accept both RFID tag and pressure/flow commands. An exemplary downhole tool is an underreamer. In one embodiment, the RFID tags may be circulated to the tool in groups of at least one or more tags, such as 2, 3, 4, or more tags. Each group of tags may be programmed with a sequence number to be transmitted to the controller. The sequence number of the tag group ensures that once the command has been received, that a tag from a previous sequence tag group will be ignored and a previous command will not be executed. For example, a tag from an earlier sequence may be temporarily lost or hung up in the circulating system, and thus, arrive at the controller after a later sequence numbered tag or group of tags. The sequence numbers may be programmed into the tag by the tool operator at the rig.

The controller's firmware may be modified to also accept commands by varying the flow rate, which changes the bore pressure inside the controller. These timed pressure changes are measured by the downhole tool and used to interpret the command, e.g., open or close, but could be a more sophisticated command. In this respect, the flow/pressure command may be a digital-bit pattern of flow/pressure open/close command which is interpreted as either an open or close command by the downhole controller. In one embodiment, the pressure command to open/close may be encoded with a sequence number. The sequence number in the pressure command may be used to avoid a later sequenced RFID tag from changing the open/close status of the downhole tool.

In another embodiment, the sequence numbers may be tied to the hour that the tool was turned on. For example, the sequence number may be tied to the time, such as hour, the controller is turned on or initialized. The sequence number then advances with the clock inside the controller. For example, the clock may advance 1 sequence number per hour. If a pressure command was sent on hour number 24, all RFID tags with a sequence number of 23 or less, would be ignored by the tool. A tool operator may keep track of the time and program RFID tags with the appropriate sequence number for the time. In this manner, an earlier sequenced RFID tag may be prevented from changing the open/close status of the downhole tool.

Figure 11:
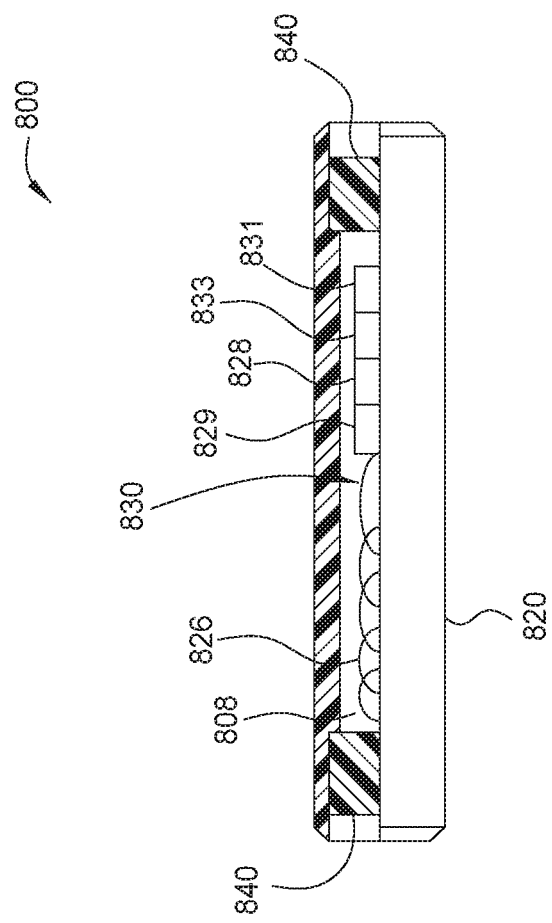
FIG. 11 illustrates an exemplary embodiment of a radio-frequency identification tag.

FIG. 11 illustrates an exemplary embodiment of a RFID tag 800. The RFID tag is suitable for use with any embodiment of operating a downhole tool described herein. The RFID tag 800 may be an active tag or a passive tag. For example, the RFID tag 800 may be an active tag that is similar to the active tag 450*a* described with respect to FIG. 4B. As such, the RFID tag 800 may include the appropriate electronics 830 such as an antenna 826, a circuit board 829, a battery 828, and a timer 831 to perform the functions discussed above with respect to the active tag 450*a*.

As shown, the RFID tag 800 includes a housing 820. In this embodiment, the housing 820 is in the shape of a tubular. The electronics 830 are disposed in a chamber 808 of the housing 820. A closure member 840 is disposed at each end of the housing 820 to retain the electronics 830 in the housing 820. Other exemplary shapes of the housing 820 include a disk, a sphere, a rectangle, and another other suitable shape. In one embodiment, the tubular shaped housing 820 may have an outer diameter between about 0.05 inches to about 1 inch; preferably, between about 0.05 inches to about 0.50 inches; more preferably, between about 0.08 inches to about 0.18 inches.

In one embodiment, the housing 820 may be made of a polymer, such as an elastomer, a plastic, a rubber, a thermoplastic elastomer, and combinations thereof. In one example, the housing 820 is made of a polyether ether ketone ("PEEK") material or made of nylon. In another example, the housing 820 is made of a polyphenylene sulfide ("PPS") material such as Ryton™, which is commercially available from Chevron. In yet another example, the housing 820 is made of a polytetrafluoroethylene ("PTFE") material such as Teflon™, which is commercially available from Dupont Company. In a further example, the housing 820 may be made from any material that allows transmission of a radio frequency and allows the RFID tag 800 to operate in the hydrostatic pressure level in the wellbore. For example, the housing 820 may be made from aluminum, an alloy, and combinations thereof. While not wishing to be bound by any theory, it is believed that use of a polymer housing may allow the RFID tag 800 to withstand higher pressures. For example, a RFID tag 800 having a polymeric housing may be used in pressures up to 40,000 psi, above 18,500 psi, above 19,000 psi, or above 22,000 psi. In another example, a RFID tag 800 having a polymeric housing may be used in a pressure from about 2,000 psi to about 40,000 psi; preferably from about 19,000 psi to about 40,000 psi; more preferably, from about 22,000 psi to about 32,000 psi. The polymeric housing 820 may conform to the electronics in response to the pressure downhole. Another advantage of a polymeric housing is the housing may absorb any mechanical contact that may be encountered downhole by the RFID tag 800.

In another embodiment, the chamber 808 of the housing 820 may include a fill material. For example, the chamber 808 may be filled with any suitable non-conductive fluid. In another example, the non-conductive fluid may be a non-corrosive fluid. An exemplary fill material is an oil such as a silicon oil. In another example, the chamber 808 may be filled with an epoxy or other suitable polymers. In yet another example, the chamber 808 may be filled with a silicone rubber such as room temperature vulcanizing ("RTV") silicone. In a further example, the fill material may be a silicone that is available either as a one part cure system or two part cure system. In a further example, the fill material may be a thick, high temperature grease. In one embodiment, the fill material may conform to the electronics 830 in the housing 820.

In one embodiment, the plug 840 may be made of a polymer or any suitable material such as a metal or alloy. The plugs 840 may be attached using an adhesive, threads, interference fit, and combinations thereof. The plugs 840 may be configured to provide a fluid tight seal or allow fluid communication between the interior of the housing 820 and the exterior of the housing 820. In another embodiment, the housing 820 may be open at only one end, and therefore, would require only one plug 840. When used in a non-conductive fluid environment, such as oil based mud, the housing 820 is not required to be sealed from fluid communication.

In another embodiment, the RFID tag 800 may be used without the housing 820. For example, the RFID tag 800 may be surrounded by a fill material such as an epoxy, RTV silicone, or other suitable polymer. In another example, when used in a non-conductive environment, such as oil based mud, the RFID tag 800 may be utilized without the housing 820 and/or the fill material.

Figure 12:
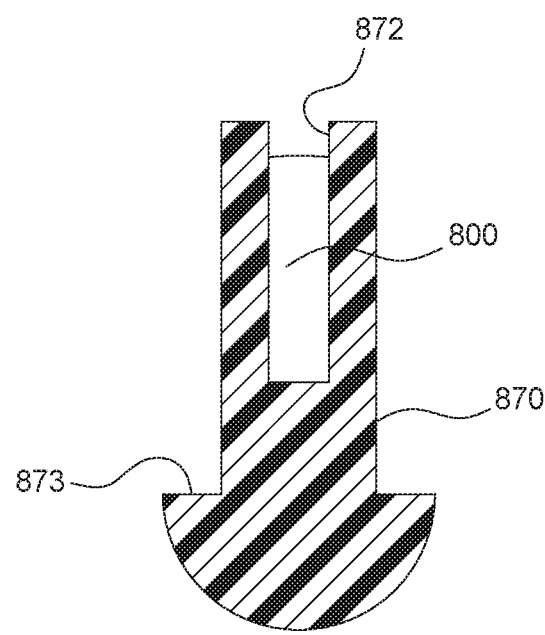
FIG. 12 illustrates an embodiment of a radio-frequency identification tag disposed in an exemplary carrier.

In another embodiment, the RFID tag 800 may optionally be inserted in a carrier 870, as shown in FIG. 12. In this embodiment, the carrier 870 includes a receptacle 872 configured to receive at least a portion of the RFID tag 800. As shown, the receptacle 872 is tubular shaped to accommodate the tubular shaped housing 820 of the RFID tag 800. It must be noted that the receptacle may be any suitable shape for accommodating the RFID tag 800. The RFID tag 800 may be coupled to the carrier 870 using an adhesive, threads, interference fit, and combinations thereof. The carrier 870 may be made of a polymer such as rubber, plastic, thermoplastic elastomer, or combinations thereof. As shown, the carrier 870 may include a front portion 873 having a larger outer diameter. The larger diameter front portion 873 may facilitate travel of the RFID tag 800 in the direction of the fluid flow. In yet another embodiment, the RFID tag 800 may be inserted in the carrier 870 without the housing 820. A fill material such an epoxy or RTV silicone may be used to fill the receptacle 872.

An exemplary RFID tag 800 may include a polymeric housing 820 containing the electronics 830 and a fill material such as RTV silicone. A plug 840 is attached to both ends of the housing 820 to fluidly seal the housing 820. The RFID tag 800 may be used to operate a downhole tool in a string of tools. For example, the BHA may include a drill bit at the bottom, then a 3D rotary steerable system, a lower underreamer, a MWD tool, a LWD tool, an upper underreamer, and other suitable components. In operation, the upper underreamer may be used during drilling to underream the drilled borehole. After drilling, the lower underreamer may be used to underream the rat-hole. To actuate the lower underreamer, the RFID tag 800 may be released into the drill string. The RFID tag 800 may flow past the upper underreamer, the LWD tool, and MWD tool, before being picked up by the lower underreamer. The RFID tag 800 is configured to only actuate the lower underreamer, not the upper underreamer. In another embodiment, the lower underreamer could be mounted just above the drill-bit, or anywhere below the MWD pulser and/or turbine. In yet another embodiment, the RFID tag 800 may be a passive tag.

It is contemplated that each of the lower underreamer and the upper underreamer may be configured to receive a RFID tag command and/or a modulated command such as a modulated pressure command, a modulated flow rate command, a modulated angular speed command, or combinations thereof. In one example, the upper underreamer is actuated using a RFID tag, and the lower underreamer is actuated using a modulated command. In another example, the upper underreamer and the lower underreamer are both actuated using RFID tags. In yet another example, the upper underreamer and the lower underreamer are both actuated using modulated commands. In yet another example, the upper underreamer is actuated using a modulated command, and the lower underreamer is actuated using a RFID tag.

It is further contemplated that the RFID tag and the modulated commands may be used to operate a downhole tool located below a MWD tool, LWD tool, a filter, a pulser, a turbine, or any other downhole tool that may form a restriction in the wellbore. For example, a modulated command may be used to operate a downhole tool located below a drillpipe filter or a turbine. In another example, the RFID tag may be sized to flow through the restriction to send a signal to the downhole tool.

Alternatively, any of the control modules 200, 300, 600, may be used with any of the underreamer 100. Alternatively, any of the sensors or electronics of the telemetry sub 400 may be incorporated into any of the control modules 300, 600 and the telemetry sub 400 may be omitted.

In another alternative (not shown), any of the electric control modules 300, 600 may include an override connection in the event that the telemetry sub 400 and/or controllers of the control modules fail. An actuator may then be deployed from the surface to the control module through the drill string using wireline or slickline. The actuator may include a mating coupling. The actuator may further include a battery and controller if deployed using slickline. The override connection may be a contact or hard-wire connection, such as a wet-connection, or a wireless connection, such as an inductive coupling. The override connection may be in direct communication with the control module actuator, e.g., the solenoid valve, so that transfer of electricity via the override connection will operate the control module actuator.

In another alternative (not shown), any of the electric control modules 300, 600 may be deployed without the electronics package and without the telemetry sub and include the override connection, discussed above. The wireline or slickline actuator may then be deployed each time it is desired to operate the control module.

Additionally, the telemetry sub 400 or any of the sensors or electronics thereof may be used with the motor actuator, the jar actuator, the vibrating jar actuator, the overshot actuator, or the disconnect actuator disclosed and illustrated in the '077 application.

In one embodiment, a method of drilling a wellbore includes running a drilling assembly into the wellbore through a casing string, the drilling assembly having a tubular string, a first underreamer, a second underreamer, and a drill bit; injecting drilling fluid through the tubular string and rotating the drill bit, wherein at least one of the first and second underreamers remain locked in a retracted position; sending a first instruction signal to the first underreamer using a radio-frequency identification device as claimed in claim 1, thereby extending the first underreamer; drilling and reaming the wellbore using the drill bit and the first underreamer; sending a second instruction signal to the second underreamer to extend second underreamer; and reaming the wellbore using the second underreamer.

In one or more of the embodiments described herein, the first underreamer is located above the second underreamer.

In one or more of the embodiments described herein, the second instruction signal comprises a modulated command.

In one or more of the embodiments described herein, the modulated command is selected from the group consisting of a modulated pressure command, a modulated flow rate command, a modulated angular speed command, and combinations thereof.

In one or more of the embodiments described herein, the second underreamer is located below a restriction.

In one or more of the embodiments described herein, wherein the restriction is formed by a MWD tool, a LWD tool, a filter, a turbine, a pulser, and combinations thereof.

In another embodiment, a method of drilling a wellbore includes running a drilling assembly into the wellbore through a casing string, the drilling assembly comprising a tubular string, a MWD tool or LWD tool, a first underreamer, a second underreamer, and a drill bit; injecting drilling fluid through the tubular string and rotating the drill bit, wherein at least one of the first and second underreamers remain locked in the retracted position; sending an instruction signal to the first underreamer, thereby extending the first underreamer; and reaming the wellbore using the first underreamer.

In one or more of the embodiments described herein, sending the instruction signal comprises sending a RFID tag.

In one or more of the embodiments described herein, the RFID tag includes a housing made of a polymer; and an antenna dispose in the housing.

In one or more of the embodiments described herein, the first underreamer is located below the MWD tool or LWD tool in the wellbore.

In one or more of the embodiments described herein, the RFID tag flows past the MWD tool or LWD tool and is received by the first underreamer.

In one or more of the embodiments described herein, the instruction signal is sent via modulation of a rotational speed of the drilling assembly, modulation of a drilling fluid flow rate, or modulation of a drilling fluid pressure.

In one or more of the embodiments described herein, the method includes encoding the modulation of the drilling fluid pressure or the drilling fluid flow rate with a sequence number.

In one or more of the embodiments described herein, the method includes associating a sequence number of the instruction signal to an actuation time of the first underreamer.

In one or more of the embodiments described herein, the method includes sending a second instruction signal to the second underreamer.

In one or more of the embodiments described herein, the second instruction signal is sent before the instruction signal to the first underreamer.

In one or more of the embodiments described herein, the second instruction signal is sent using a RFID tag.

While the foregoing is directed to embodiments of the present invention, other and further embodiments of the invention may be devised without departing from the basic scope thereof, and the scope thereof is determined by the claims that follow.

The invention claimed is:

1. A radio-frequency identification device for use in a wellbore, comprising:
   a housing made of a polymer;
   an antenna disposed in the housing; and
   a carrier having:
   a cylindrical body portion having a receptacle for receiving the housing; and
   a front portion having an outer diameter larger than an outer diameter along an entire length of the cylindrical body portion, wherein the housing is disposed in the receptacle via an opening at a back end of the cylindrical body portion.

2. The device of claim 1, wherein the polymer is selected from the group consisting of an elastomer, a plastic, a rubber, a thermoplastic elastomer, and combinations thereof.

3. The device of claim 1, wherein the polymer is selected from the group consisting of polyether ether ketone, nylon, polyphenylene sulfide, polytetrafluoroethylene, and combinations thereof.

4. The device of claim 3, further comprising a fill material disposed in the housing.

5. The device of claim 4, wherein the fill material is selected from the group consisting of oil and silicone.

6. The device of claim 1, wherein the polymer is made from a material that allows the transmission of a radio frequency signal.

7. The device of claim 1, further comprising a fill material disposed in the housing, wherein the fill material is selected from the group consisting of oil, and silicone.

8. The device of claim 1, further comprising a fill material disposed in the housing, wherein the fill material comprises an epoxy.

9. A method of drilling a wellbore, comprising:
   running a drilling assembly into the wellbore through a casing string, the drilling assembly having a tubular string, a first underreamer, a second underreamer, and a drill bit;
   injecting drilling fluid through the tubular string and rotating the drill bit, wherein at least one of the first and second underreamers remain locked in a retracted position;

sending a first instruction signal to the first underreamer using a radio-frequency identification device as claimed in claim 1, thereby extending the first underreamer;

drilling and reaming the wellbore using the drill bit and the first underreamer;

sending a second instruction signal to the second underreamer to extend second underreamer; and reaming the wellbore using the second underreamer.

10. The method of claim 9, wherein the first underreamer is located above the second underreamer.

11. The method of claim 9, wherein the second instruction signal comprises a modulated command.

12. The method of claim 11, wherein the modulated command is selected from the group consisting of a modulated pressure command, a modulated flow rate command, a modulated angular speed command, and combinations thereof.

13. The method of claim 12, wherein the second underreamer is located below a restriction.

14. A method of drilling a wellbore, comprising:
running a drilling assembly into the wellbore through a casing string, the drilling assembly comprising a tubular string, a MWD tool or LWD tool, a first underreamer, a second underreamer located above the first underreamer, and a drill bit;
injecting drilling fluid through the tubular string and rotating the drill bit, wherein at least one of the first and second underreamers remain locked in the retracted position;
sending an instruction signal to the first underreamer, thereby extending the first underreamer, wherein the instruction signal is sent by sending a radio-frequency identification device having:
a housing made of a polymer;
an antenna disposed in the housing; and
a carrier having:
a cylindrical body portion having a receptacle for receiving the housing; and
a front portion having an outer diameter larger than an outer diameter along an entire length of the cylindrical body portion,
wherein the housing is disposed in the receptacle via an opening at a back end of the cylindrical body portion; and
reaming the wellbore using the first underreamer.

15. The method of claim 14, wherein the first underreamer is located below the MWD tool or LWD tool.

16. The method of claim 15, wherein the radio-frequency identification device passes through the MWD tool or LWD tool before sending the instruction signal to the first underreamer.

17. The method of claim 14, further comprising sending a second instruction signal to the second underreamer.

18. The method of claim 17, wherein the second instruction signal is sent before the instruction signal to the first underreamer.

19. The method of claim 17, wherein the second instruction signal is sent via modulation of a rotational speed of the drilling assembly, modulation of a drilling fluid flow rate, or modulation of a drilling fluid pressure.

20. The method of claim 19, further comprising encoding the modulation of the drilling fluid pressure or the drilling fluid flow rate with a sequence number.

21. The method of claim 20, further comprising associating a sequence number of the second instruction signal to an actuation time of the first underreamer.

* * * * *